(12) United States Patent
Clothier et al.

(10) Patent No.: US 8,373,371 B2
(45) Date of Patent: Feb. 12, 2013

(54) CONTROL OF AN ELECTRIC MACHINE

(75) Inventors: Andrew Charlton Clothier, Malmesbury (GB); Tuncay Celik, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 12/753,522

(22) Filed: Apr. 2, 2010

(65) Prior Publication Data

US 2010/0253265 A1    Oct. 7, 2010

(30) Foreign Application Priority Data

Apr. 4, 2009    (GB) .................................. 0905925.4

(51) Int. Cl.
*H02P 27/00*    (2006.01)

(52) U.S. Cl. ................... 318/400.13; 318/799; 318/779; 318/400.12; 318/437; 318/438

(58) Field of Classification Search ............. 318/400.14, 318/400.13, 830, 831, 400.16, 400.18, 701, 318/729, 799, 779, 400.12, 715, 437, 438; 323/217; 310/69 B, 191, 290
See application file for complete search history.

(56) References Cited

U.S. PATENT DOCUMENTS

| | | | | |
|---|---|---|---|---|
| 4,323,835 A * | 4/1982 | Lee | ................................. | 318/729 |
| 5,023,527 A * | 6/1991 | Erdman et al. | ............ | 318/400.34 |
| 5,041,749 A | 8/1991 | Gaser et al. | | |
| 5,274,287 A | 12/1993 | Bahn | | |
| 5,428,522 A | 6/1995 | Millner et al. | | |
| 5,737,798 A | 4/1998 | Moren et al. | | |
| 5,796,194 A * | 8/1998 | Archer et al. | ................ | 310/68 B |
| 5,796,226 A | 8/1998 | Ookawa et al. | | |
| 6,002,222 A * | 12/1999 | Turner | ........................ | 318/254.1 |
| 6,014,003 A | 1/2000 | French | | |
| 6,034,493 A * | 3/2000 | Boyd et al. | ............... | 318/400.31 |
| 6,194,852 B1 | 2/2001 | Lovatt et al. | | |
| 6,297,613 B1 * | 10/2001 | Elliott et al. | ................... | 318/701 |
| 6,373,211 B1 | 4/2002 | Henry et al. | | |
| 6,476,510 B2 | 11/2002 | Soucy | | |
| 6,490,752 B2 | 12/2002 | Kushida et al. | | |
| 6,495,985 B1 * | 12/2002 | Mayes et al. | ................... | 318/701 |
| 6,872,533 B2 | 3/2005 | Toland et al. | | |

(Continued)

FOREIGN PATENT DOCUMENTS

| | | |
|---|---|---|
| DE | 39 32 802 | 4/1991 |
| DE | 10 2006 052 966 | 5/2007 |

(Continued)

OTHER PUBLICATIONS

GB Search Report dated Aug. 5, 2009, directed to counterpart GB Patent Application No. 0905925.4; 1 page.

(Continued)

*Primary Examiner* — Rita Leykin
(74) *Attorney, Agent, or Firm* — Morrison & Foerster LLP

(57) ABSTRACT

A method of controlling an electric machine that includes sequentially exciting and freewheeling a winding of the electric machine. The winding is excited in advance of zero-crossings of back emf in the winding by an advance angle, and the winding is freewheeled over a freewheel angle. The method then includes varying the advance angle and the freewheel angle in response to changes in the voltage used to excite the winding. Additionally, a control system for an electric machine, and a product incorporating the control system and electric machine.

17 Claims, 8 Drawing Sheets

U.S. PATENT DOCUMENTS

| | | | |
|---|---|---|---|
| 6,972,533 B2 * | 12/2005 | Jordison et al. | 318/254.1 |
| 6,979,970 B2 * | 12/2005 | Iwanaga et al. | 318/400.35 |
| 7,183,734 B2 | 2/2007 | Lassen | |
| 7,351,269 B2 | 4/2008 | Yau | |
| 7,436,139 B2 | 10/2008 | Maslov et al. | |
| 7,701,164 B2 | 4/2010 | Clothier et al. | |
| 7,750,594 B2 | 7/2010 | Clothier et al. | |
| 7,847,511 B2 | 12/2010 | Yoo et al. | |
| 7,893,638 B2 | 2/2011 | Akama et al. | |
| 7,898,209 B2 | 3/2011 | Kim et al. | |
| 7,932,688 B2 | 4/2011 | Han et al. | |
| 8,030,867 B1 | 10/2011 | Allison, III | |
| 2003/0011347 A1 | 1/2003 | Kaplan et al. | |
| 2003/0121685 A1 | 7/2003 | Yamamoto | |
| 2003/0227271 A1 | 12/2003 | Shindo | |
| 2004/0145330 A1 | 7/2004 | Maslov et al. | |
| 2004/0245949 A1 | 12/2004 | Ueda et al. | |
| 2005/0007051 A1 | 1/2005 | Lelkes | |
| 2005/0141887 A1 | 6/2005 | Lelkes | |
| 2006/0132076 A1 | 6/2006 | Finsinger et al. | |
| 2006/0186846 A1 | 8/2006 | Lassen | |
| 2007/0252551 A1 * | 11/2007 | Clothier et al. | 318/705 |
| 2007/0267990 A1 | 11/2007 | Abolhassani et al. | |
| 2008/0252242 A1 | 10/2008 | Akama et al. | |
| 2008/0295275 A1 | 12/2008 | Yoo et al. | |
| 2008/0297086 A1 | 12/2008 | Han et al. | |
| 2008/0297101 A1 | 12/2008 | Yoo et al. | |
| 2008/0297102 A1 | 12/2008 | Kim et al. | |
| 2009/0230905 A1 | 9/2009 | Proctor et al. | |
| 2010/0251509 A1 | 10/2010 | Clothier | |
| 2010/0251510 A1 | 10/2010 | Clothier et al. | |
| 2010/0251511 A1 | 10/2010 | Clothier et al. | |
| 2010/0251512 A1 | 10/2010 | Clothier et al. | |
| 2010/0253257 A1 | 10/2010 | Clothier et al. | |
| 2010/0253261 A1 | 10/2010 | Dawe et al. | |
| 2010/0253263 A1 | 10/2010 | Clothier et al. | |
| 2010/0253264 A1 | 10/2010 | Clothier et al. | |
| 2010/0253274 A1 | 10/2010 | Clothier et al. | |

FOREIGN PATENT DOCUMENTS

| | | |
|---|---|---|
| EP | 0 505 159 | 9/1992 |
| EP | 0 841 744 | 5/1998 |
| EP | 0 848 489 | 7/1998 |
| EP | 1 221 763 | 7/2002 |
| EP | 1 786 093 | 5/2007 |
| EP | 1 997 417 | 12/2008 |
| GB | 2 301 904 | 12/1996 |
| GB | 2 410 847 | 8/2005 |
| GB | 2 410 848 | 8/2005 |
| GB | 2469144 | 10/2010 |
| JP | 9-294389 | 11/1997 |
| JP | 10-155299 | 6/1998 |
| JP | 10-315148 | 12/1998 |
| JP | 2001-211680 | 8/2001 |
| JP | 2003-189667 | 7/2003 |
| JP | 2005-210866 | 8/2005 |
| JP | 2006-129632 | 5/2006 |
| JP | 2006-237726 | 9/2006 |
| JP | 2007-520988 | 7/2007 |
| JP | 2008-141902 | 6/2008 |
| JP | 2009-44846 | 2/2009 |
| JP | 2010-246381 | 10/2010 |
| JP | 2010-246382 | 10/2010 |
| KR | 2003-0017042 | 3/2003 |
| WO | WO-2005/076459 | 8/2005 |
| WO | WO-2008/039287 | 4/2008 |

OTHER PUBLICATIONS

Heinrichs, F. (2001). "TLE 472x—Stepper Motor Drivers; Current Control Method and Accuracy," *Application Note Infineon* 1:0; 1-4.

International Search Report and Written Opinion mailed Aug. 11, 2010, directed to counterpart International Application No. PCT/GB2010/050563; 15 pages.

"DMOS Microstepping Driver with Translator," located at <www.allegromicro.com/en/Products/Part_Numbers/3984/3984.pdf> retrieved on Jan. 1, 2005; 12 pages.

Dawe et al., U.S. Office Action mailed Jul. 17, 2012, directed to U.S. Appl. No. 12/750,193; 11 pages.

Clothier et al., U.S. Office Action mailed Jul. 20, 2012, directed to U.S. Appl. No. 12/750,466; 13 pages.

Clothier et al., U.S. Office Action mailed May 18, 2012, directed to U.S. Appl. No. 12/752,872; 11 pages.

Clothier et al., U.S. Office Action mailed Aug. 17, 2012, directed to U.S. Appl. No. 12/749,156; 9 pages.

Clothier et al., U.S. Office Action mailed Sep. 18, 2012, directed to U.S. Appl. No. 12/750,256; 5 pages.

Clothier, A., U.S. Office Action mailed on Oct. 18, 2012, directed to U.S. Appl. No. 12/750,247; 7 pages.

Clothier, A., U.S. Office Action mailed on Oct. 5, 2012, directed to U.S. Appl. No. 12/752,683; 7 pages.

\* cited by examiner

CONTROL OF AN ELECTRIC MACHINE

REFERENCE TO RELATED APPLICATIONS

This application claims the priority of United Kingdom Application No. 0905925.4, filed Apr. 4, 2009, the entire contents of which are incorporated herein by reference.

FIELD OF THE INVENTION

The present invention relates to control of an electric machine.

BACKGROUND OF THE INVENTION

As the permanent-magnet rotor of an electric machine rotates, it induces a back emf in a winding of the electric machine. As the rotor accelerates, the magnitude of the back emf increases. It therefore becomes increasingly difficult to drive current, and thus power, into the electric machine. As a result, control over the power of the electric machine becomes increasingly difficult.

SUMMARY OF THE INVENTION

In a first aspect, the present invention provides a method of controlling an electric machine, the method comprising: sequentially exciting and freewheeling a winding of the electric machine, wherein the winding is excited by an excitation voltage in advance of zero-crossings of back emf in the winding by an advance angle and the winding is freewheeled over a freewheel angle; and varying the advance angle and the freewheel angle in response to changes in the excitation voltage.

By varying both the advance angle and the freewheel angle in response to changes in the excitation voltage, better control over both the efficiency and the power of the electric machine may be achieved. For example, by increasing the advance angle, current is driven into the winding at an earlier stage and thus the power is increased. Equally, by decreasing the freewheel angle, current is driven into the winding for a longer period and thus the power is increased.

In the region of falling back emf, less torque is achieved for a given level of current. Accordingly, by freewheeling within this region, a more efficient electric machine may be realised. Additionally, as the back emf in the winding falls, current spikes may arise should the excitation voltage exceed the falling back emf. By freewheeling the winding within the region of falling back emf, current spikes may be avoided and thus a smoother current waveform may be achieved.

Preferably, the advance angle is increased and the freewheel angle is decreased in response to a decrease in the excitation voltage. Consequently, as the excitation voltage decreases, current is driven into the winding at an earlier stage. Additionally, current is driven into the winding for a longer period. Accordingly, in spite of a drop in excitation voltage, the same or similar power may be achieved. Indeed, the method preferably comprises varying the advance angle and the freewheel angle such that the power of the electric machine is substantially constant over a range of excitation voltages. Substantially constant power in this instance should be understood to mean that the variance in power is no more than +/−5%.

The method advantageously comprises varying the advance angle and the freewheel angle such that the efficiency of the electric machine (i.e. the ratio of output power to input power) is at least 75% over a range of excitation voltages. Accordingly, relatively good efficiency is achieved over a range of excitation voltages.

The range of excitation voltages may extend between a minimum voltage and a maximum voltage, with the minimum voltage being less than 80% of the maximum voltage. This then represents a relatively broad range of voltages over which constant power and/or good efficiency may be achieved. Consequently, a battery pack may be used to as an excitation source. In spite of battery discharge with use, constant power and/or good efficiency may nevertheless be achieved.

The method may comprises exciting the winding, monitoring a signal indicative of back emf in the winding, continuing to excite the winding over a drive-off angle, and freewheeling the winding. The drive-off angle is then proportional to the sum of the advance angle and the freewheel angle. This then presents a convenient method of exciting the winding in advance of zero-crossings of back emf.

The method may include storing a power lookup table of first control values and second control values for a plurality of voltages. The method then comprises selecting from the power lookup table a first control value and a second control value according to the level of the excitation voltage, and exciting the winding at a time defined by the first control value and freewheeling the winding for a time defined by the second control value. This then simplifies the control of the electric machine.

The first control value is preferably proportional to the advance angle and the second control value is proportional to the freewheel angle. More preferably, the first control value is proportional to the sum of the advance angle and the freewheel angle. This then simplifies the calculation of the drive-off angle.

The method may comprise exciting the winding, monitoring a signal indicative of back emf in the winding, continuing to excite the winding for a drive-off time in response to detecting an edge of the signal, and freewheeling the winding for a freewheel time. The drive-off time is then proportional to the first control value and the freewheel time is proportional to the second control value.

Each pair of first and second control values ideally result in the same power for the electric machine when operating at a nominal speed. Consequently, constant power is maintained over a range of voltages at the nominal speed.

The first control value is advantageously proportional to the sum of the advance time and the freewheel time. This then simplifies the calculation of the drive-off time. Indeed, if each electrical half cycle has a half-cycle time, the drive-off time is ideally proportional to the half-cycle time minus the first control value.

The method advantageously comprises applying a speed-correction value to at least one of the first control value and the second control value. The speed-correction value then varies with both the speed of the electric machine and the level of the excitation voltage. As the speed of the electric machine varies, the back emf induced in the winding, and thus the power of the electric machine, also varies. By correcting one or more of the control values for speed, the effect of speed on the power can be reduced. However, the ideal correction depends on the level of the excitation voltage. In particular, a larger correction is ideally required for a lower excitation voltage. By applying a speed-correction value that varies with both speed of the electric machine and the level of excitation voltage, better control over power may be achieved.

The method may comprise storing a speed-correction lookup table of speed-correction values for a plurality of speeds and a plurality of voltages, selecting from the speed lookup table a speed-correction value according to the speed of the electric machine and the level of the excitation voltage. This then simplifies the control of the electric machine.

The speed-correction lookup table ideally stores an advance speed-correction value and a freewheel speed-correction value for each of the plurality of speeds and the plurality of voltages. The method then comprises selecting from the speed lookup table an advance speed-correction value and a freewheel speed-correction value according to the speed of the electric machine and the level of the excitation voltage, and applying the advance-speed correction value to the first control value and applying the freewheel speed-correction value to the second control value. Accordingly, both the first control value, which influences the advance angle, and the second control value, which influences the freewheel angle, are corrected for speed and thus better control over power may be achieved.

Preferably, the method comprises varying at least one of the advance angle and the freewheel angle in response to changes in speed of the electric machine. Accordingly, better control of power may be achieved in response to both changes in excitation voltage and speed of the electric machine. Indeed, the method preferably comprises increasing the advance angle and/or decreasing the freewheel angle in response to an increase in the speed. Accordingly, as the speed of the electric machine increases, and thus the back emf in the winding increases, current is driven into the winding at an earlier stage and/or current is driven into the winding over a longer period. Accordingly, the same or similar power may be achieved irrespective of changes in speed of the electric machine.

Advantageously, each electrical half cycle comprises a single drive period and a single freewheel period. The winding is then excited during the drive period and freewheeled during the freewheel period. Following the freewheel period, the winding is commutated.

In a second aspect, the present invention provides a control system for an electric machine, the control system performing the method as described in any one of the preceding paragraphs.

The control system ideally comprises a position sensor, such as a Hall-effect sensor, that outputs a signal indicative of back emf in the winding. The control system then uses the signal output by the position sensor to control excitation and freewheeling of the winding.

The control system may comprise a current controller for limiting current in the winding during excitation. This then prevents excessive currents building up in the winding, which might otherwise damage components of the control system or demagnetise magnets of the electric machine.

The control system may also comprise an inverter, a gate driver module and a drive controller. The drive controller then generates one or more control signals to control excitation of the winding, and the gate driver module in response to the control signals controls switches of the inverter.

In a third aspect, the present invention provides a battery-powered product comprising an electric machine and a control system as described in any one of the preceding paragraphs. The control system then excites the winding using the voltage of the battery pack. The control system then varies the advance angle and the freewheel angle in response to changes in the voltage of the battery pack.

In a fourth aspect, the present invention provides a vacuum cleaner comprising an electric machine and a control system as described in any one of the preceding paragraphs.

The electric machine is preferably a permanent-magnet motor, and more preferably a single-phase permanent-magnet motor.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
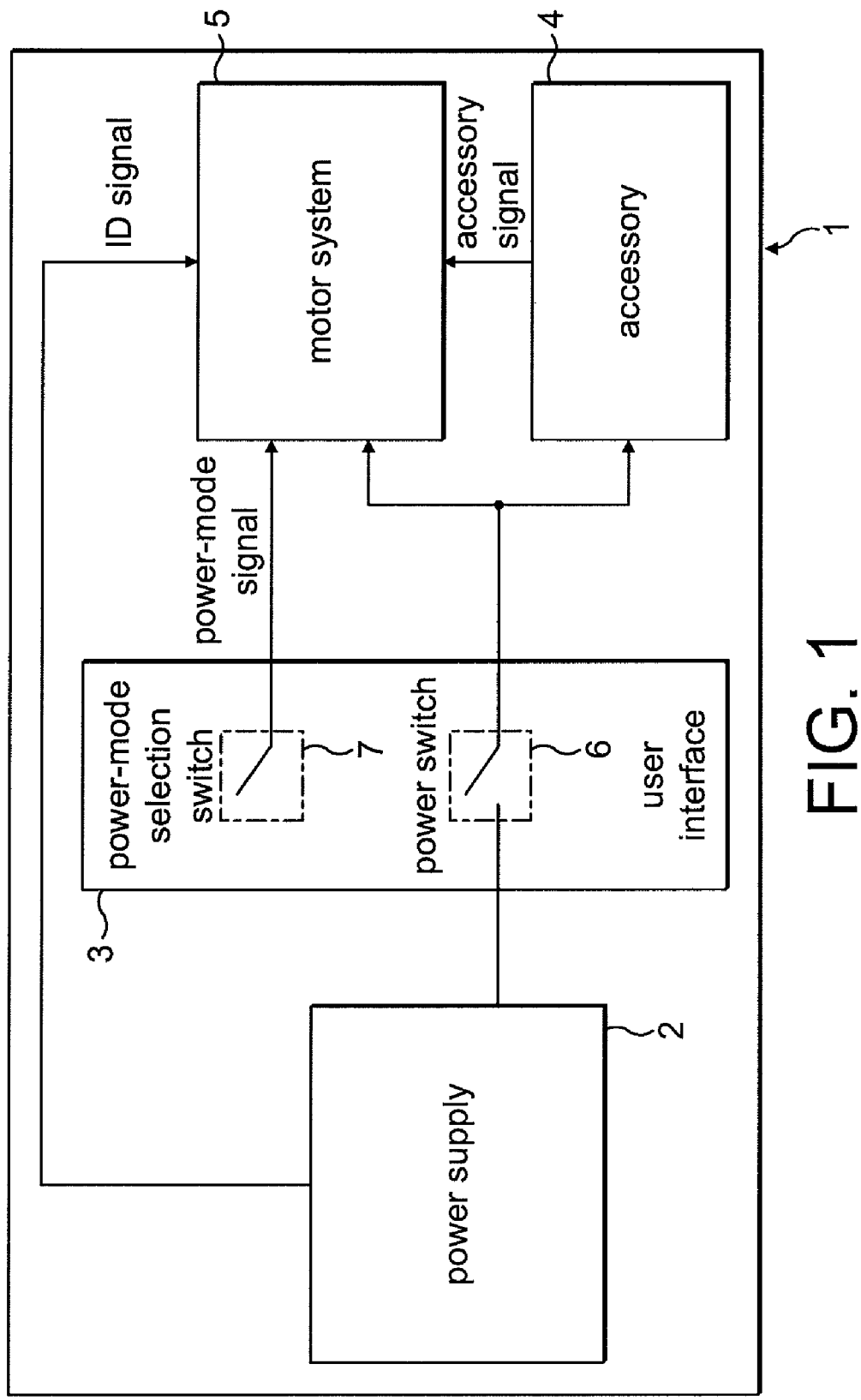
FIG. 1 is a block diagram of a product in accordance with the present invention.

The product 1 of FIG. 1 comprises a power supply 2, a user interface 3, an accessory 4, and a motor system 5.

The power supply 2 comprises a battery pack that supplies a DC voltage to both the accessory 4 and the motor system 5. The power supply 2 is removable from the product 1 such that the product 1 may be used with different battery packs. For the purposes of the present description, the power supply 2 is either a 4-cell battery pack providing a 16.4 V DC supply or 6-cell battery pack providing a 24.6 V DC supply. In addition to providing a supply voltage, the power supply outputs an identification signal that is unique to the type of battery pack. The ID signal takes the form of a square-wave signal having a frequency that varies according to the type of battery pack. In the present example, the 4-cell battery pack outputs an ID signal having a frequency of 25 Hz (20 ms pulse length), while the 6-cell battery pack outputs an ID signal having a frequency of 50 Hz (10 ms pulse length). The ID signal continues to be output by the power supply 2 until such time as a fault is detected within the power supply 2, e.g. under-voltage or over-temperature of the cells. As is described below, the ID signal is used by the motor system 5 to identify the type of power supply 2 and to periodically check that the power supply 2 is functioning correctly.

The user interface 3 comprises a power switch 6 and a power-mode selection switch 7. The power switch 6 is used to power on and off the product 1. In response to closing the power switch 6, a closed circuit is formed between the power supply 2 and each of the accessory 4 and the motor system 5. The power-mode selection switch 7 is used to control whether the motor system 5 operates in a high-power mode or a low-power mode. When the power-mode selection switch 7 is closed, a logically high power-mode signal is output to the motor system 5.

The accessory 4 is removably attached to the product 1. When attached to the product 1 and the product 1 is powered on, the accessory 4 draws power from the power supply 2 and outputs an accessory signal to the motor system 5. Rather than continually drawing power whenever the accessory 4 is attached and the product 1 is powered on, the accessory 4 may include a power switch (not shown), e.g. forming part of the user interface 3. The accessory 4 then draws power and outputs the accessory signal only when the accessory power switch is closed.

Figure 2:
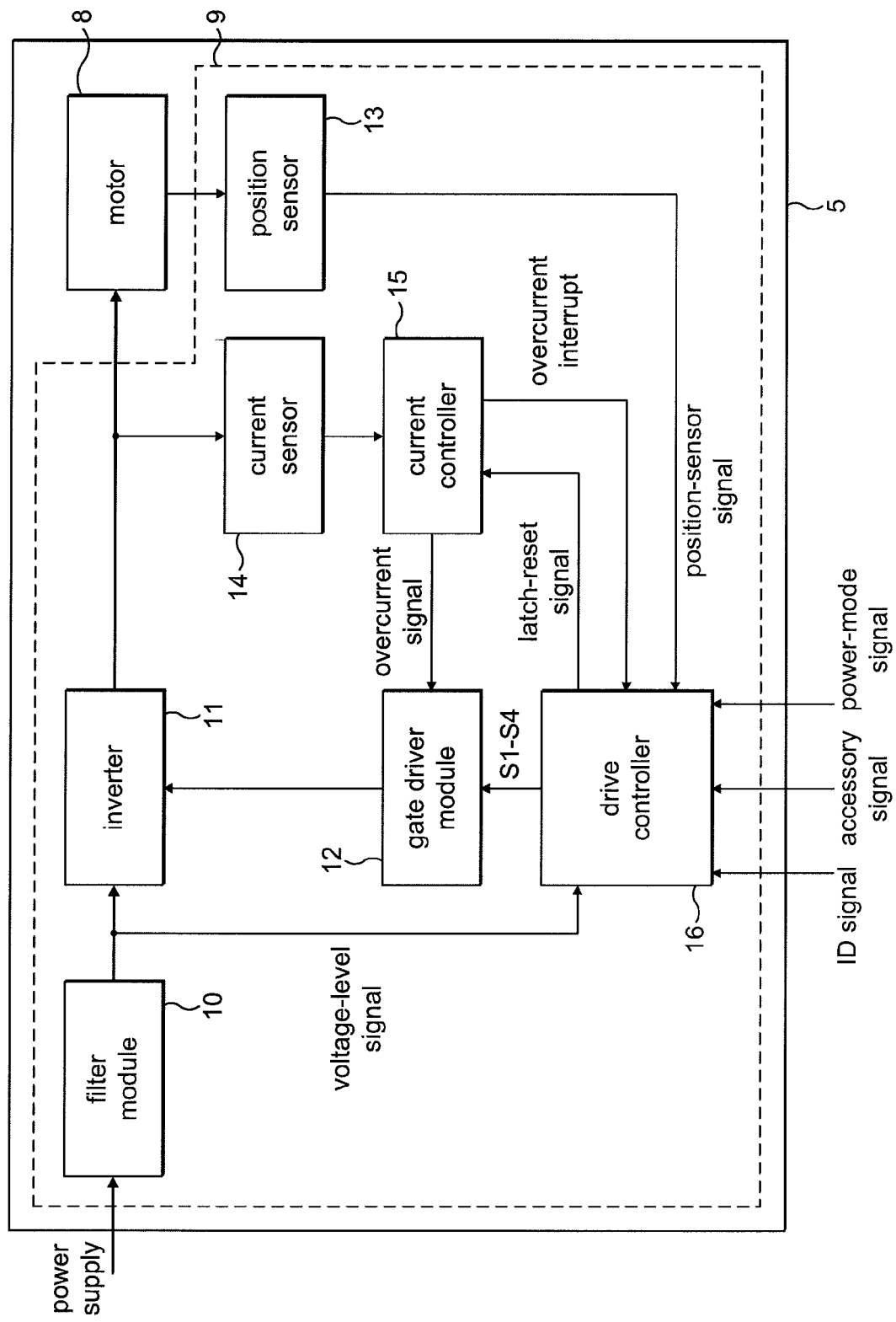
FIG. 2 is a block diagram of the motor system of the product of FIG. 1.
Figure 3:
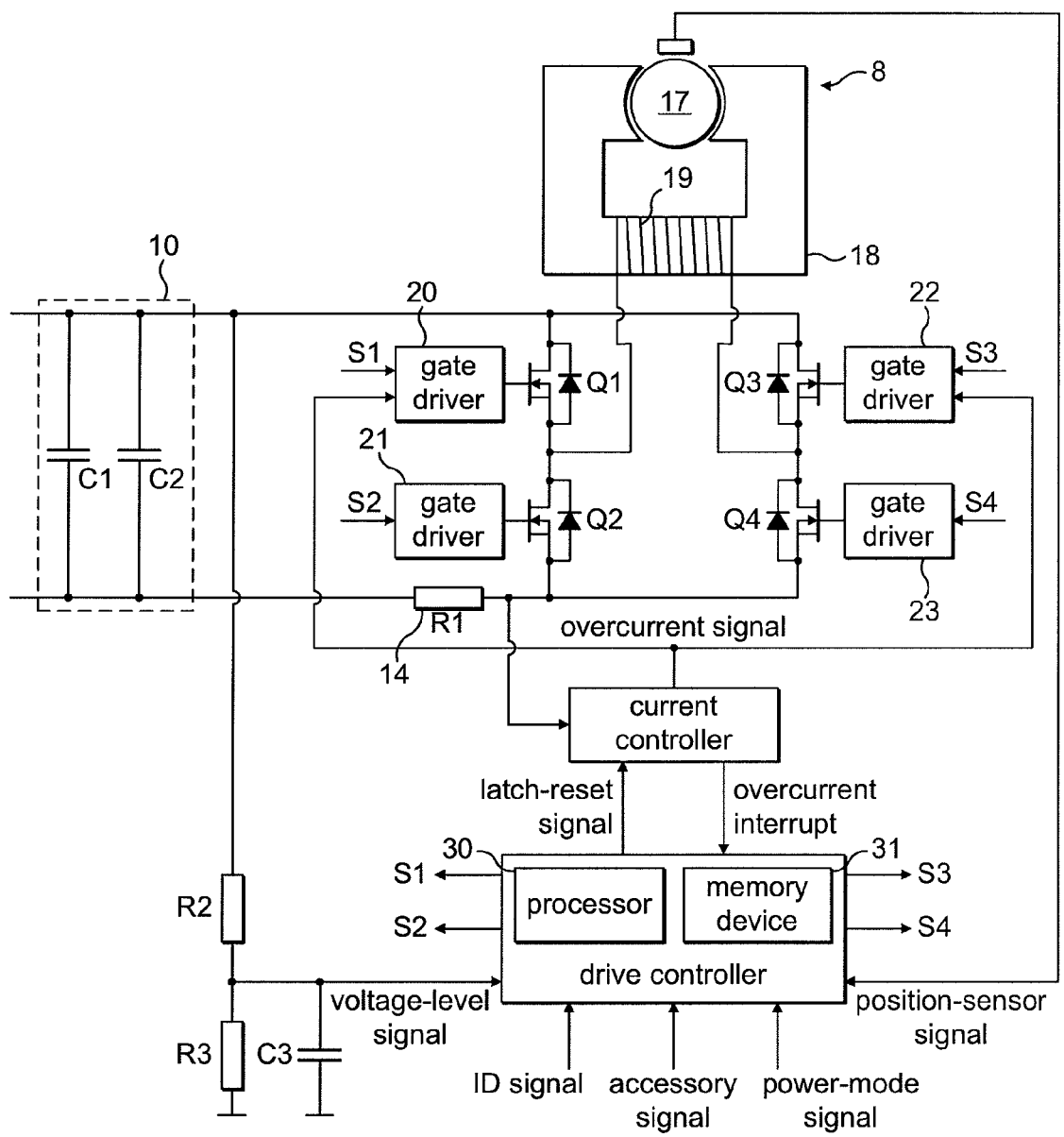
FIG. 3 is a schematic diagram of the motor system.

Referring now to FIGS. 2 and 3, the motor system 5 comprises an electric motor 8 and a control system 9.

The motor 8 comprises a two-pole permanent-magnet rotor 17 that rotates relative to a stator 18 about which a single-phase winding 19 is wound. The stator 18 is c-shaped, which enables a high fill-factor to be achieved for the winding 19. Accordingly, copper losses may be reduced, thereby improving the efficiency of the motor 8.

The control system 9 comprises a filter module 10, an inverter 11, a gate driver module 12, a position sensor 13, a current sensor 14, a current controller 15, and a drive controller 16.

The filter module 10 links the power supply 2 of the product 1 to the inverter 11, and comprises a pair of capacitors C1,C2 arranged in parallel. The filter module 10 acts to reduce ripple in the voltage linked to the inverter 11.

The inverter 11 comprises a full-bridge of four power switches Q1-Q4 that link the power supply 2 to the winding 19 of the motor 8. Each power switch Q1-Q4 is a MOSFET, which provides fast switching and good efficiency over the voltage range of the power supply 2. Other types of power switch might nevertheless be used, such as IGBTs or BJTs, particularly if the voltage of the power supply 2 exceeds the voltage rating of the MOSFETs. Each of the switches Q1-Q4 includes a flyback diode, which protects the switch against voltage spikes from the back era of the motor 8 during switching.

When a first pair of switches Q1,Q4 is closed, the winding 19 is excited in a first direction (excite from left-to-right), causing current to be driven around the winding 19 in a first direction. When a second pair of switches Q2,Q3 is closed, the winding 19 is excited in an opposite direction (excite from right-to-left), causing current to be driven around the winding 19 in an opposite direction. Accordingly, the switches Q1-Q4 of the inverter 11 can be controlled so as to commutate current in the winding 19.

In addition to exciting the winding 19, the inverter 11 may be controlled so as to freewheel the winding 19. Freewheeling occurs when the winding 19 is disconnected from the excitation voltage provided by the power supply 2. This may occur by opening all switches Q1-Q4 of the inverter 11. However, the efficiency of the motor system 5 is improved if either the high-side switches Q1,Q3 or the low-side switches Q2,Q4 are closed during freewheeling. By closing either the high-side switches Q1,Q3 or the low-side switches Q2,Q4, current in the winding 19 is able to re-circulate through the switches rather than the less efficient flyback diodes. For the purposes of the present description, freewheeling is achieved by closing both low-side switches Q2,Q4. However, it should be understood that freewheeling might equally be achieved by closing the high-side switches Q1,Q3 or by opening all switches Q1-Q4.

The gate driver module 12 drives the opening and closing of the switches Q1-Q4 of the inverter 11 in response to control signals S1-S4 received from the drive controller 16. The gate driver module 12 comprises four gate drivers 20-23, each gate driver driving a respective switch Q1-Q4 in response to a control signal S1-S4 from the drive controller 16. The gate drivers 20,22 responsible for the high-side switches Q1,Q3 are additionally driven in response to an overcurrent signal received from the current controller 15. In response to the overcurrent signal, the gate drivers 20,22 open the high-side switches Q1,Q3. The overcurrent signal takes precedence over the control signals S1,S3 of the drive controller 16 such that the high-side switches Q1,Q3 are opened in response to the overcurrent signal irrespective of the state of the control signals S1,S3. This level of control may be achieved through the provision of a NOR gate at the high-side gate drivers 20,22.

Table 1 summarises the allowed states of the switches Q1-Q4 in response to the control signals S1-S4 of the drive controller 16 and the overcurrent signal of the current controller 15. Owing to the NOR gate operating on the inputs of the high-side gate drivers 20,22, the high-side switches Q1,Q3 are closed by control signals S1,S3 that are logically low.

TABLE 1

| Overcurrent Signal | Control Signals | | | | Power Switches | | | | Inverter Condition |
|---|---|---|---|---|---|---|---|---|---|
| | S1 | S2 | S3 | S4 | Q1 | Q2 | Q3 | Q4 | |
| 1 | X | X | X | X | 0 | X | 0 | X | High-Side Switches Off |
| 0 | 0 | 0 | 1 | 1 | 1 | 0 | 0 | 1 | Excite Left to Right |
| 0 | 1 | 1 | 0 | 0 | 0 | 1 | 1 | 0 | Excite Right to Left |
| 0 | 1 | 1 | 1 | 1 | 0 | 1 | 0 | 1 | Freewheel |
| 0 | 1 | 0 | 1 | 0 | 0 | 0 | 0 | 0 | All Switches Off |

The position sensor 13 is a Hall-effect sensor that outputs a signal indicative of the angular position of the permanent-magnet rotor 17. The signal is a digital square wave, with each edge representing the angular position at which the polarity of the rotor changes. The signal output by the position sensor 13 is delivered to the drive controller 16, which in response generates control signals S1-S4 that control the inverter 11 and thus control the power delivered to the motor 8.

When rotating, the permanent-magnet rotor 17 induces a back emf in the winding 19 of the motor 8. The polarity of the back emf changes with the polarity of the rotor 17. Consequently, the position-sensor signal provides not only a measure of the electrical position of the rotor 17, but also a measure of the back emf in the winding 19. Ideally, the position sensor 13 is aligned relative to the rotor 17 such that the edges of the position-sensor signal are synchronous, or have a predetermined phase difference, with the zero-crossings of the back emf. However, following assembly of the motor system 5, there are tolerances associated with the alignment of the position sensor 13 relative to the motor 8. This in turn leads to a phase difference between the edges of the position-sensor signal and the zero-crossings of the back emf. As is described further on in the section entitled 'Post-Assembly Fine Tune', these tolerances are compensated through the use of a position-sensor offset which the drive controller 16 stores and subsequently uses to correct the position-sensor signal.

The current sensor 14 comprises a single sense resistor R1 located on the negative rail of the inverter 11. The voltage across the current sensor 14 therefore provides a measure of the current in the winding 19 when connected to the power supply 2. The voltage across the current sensor 14 is output to the current controller 15.

Figure 4:
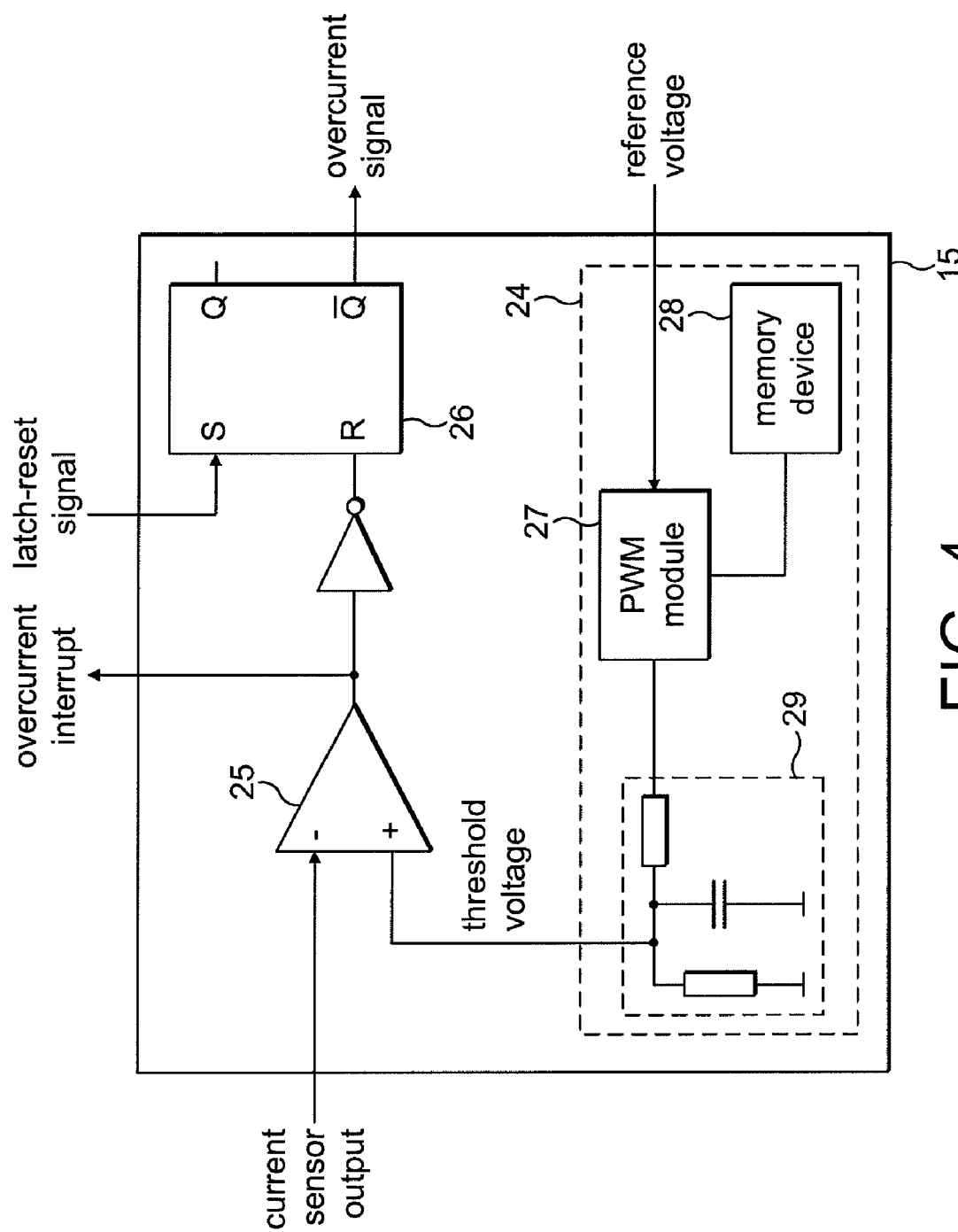
FIG. 4 is a schematic diagram of a current controller of the motor system.

Referring now to FIG. 4, the current controller 15 comprises an input, an output, a threshold generator 24, a comparator 25 and an SR latch 26.

The input of the current controller 15 is coupled to the output of the current sensor 14, and the output of the current controller 15 is coupled to the input of each of the high-side gate drivers 20,22.

The threshold generator 24 comprises a reference voltage input, a PWM module 27, a non-volatile memory device 28, and a filter 29. The PWM module 27 employs a fixed frequency and a variable duty cycle that is set according to a scaling factor stored in the memory device 28. The PWM module 27 operates on the voltage at the reference input to provide a pulsed voltage signal, which is then smoothed by the filter 29 to provide a scaled threshold voltage.

The comparator 25 compares the voltage at the input of the current controller 15 against the threshold voltage output by the threshold generator 24. If the voltage at the input exceeds the threshold voltage, the comparator 25 outputs a signal that sets the SR latch 26. In response, the SR latch 26 generates an overcurrent signal at the output of the current controller 15.

As noted above in Table 1, when the overcurrent signal is output by the current controller 15 (i.e. when the overcurrent signal is logically high), the high-side gate drivers 20,22 open the high-side switches Q1,Q3. Consequently, the current controller 15 disconnects the winding 19 from the excitation voltage provided by the power supply 2 when the current in the winding 19 exceeds a threshold. As is described further on in the section entitled 'Post-Assembly Fine Tune', by employing a voltage threshold that is scaled according to a scaling factor, each individual motor system 5 may be fine-tuned such that the effect of component tolerances on the current threshold can be trimmed out.

The current controller 15 also outputs an overcurrent interrupt to the drive controller 16. In the embodiment illustrated in FIG. 4, the output of the comparator 25 is delivered to the drive controller 16 as the overcurrent interrupt. However, the overcurrent signal output by the latch 26 might equally be delivered to the drive controller 16 as the overcurrent interrupt. In response to the overcurrent interrupt, the drive controller 16 executes an overcurrent routine. The drive controller 16 generates a control signal S2 or S4 that causes the remaining low-side switch Q2 or Q4 to close such that the winding 19 freewheels. Freewheeling continues for a predetermined time, e.g. 100 μs, during which the current in the winding 19 decays. After the predetermined time has elapsed, the driver controller 16 switches the control signal S2 or S4 so as to open the recently closed low-side switch Q2 or Q4 and outputs an latch-reset signal to the current controller 15. The latch-reset signal causes the latch 26 of the current controller 15 to reset, thereby driving the overcurrent signal low. The inverter 11 is thus returned to the condition that existed before the overcurrent event occurred.

Figure 5:
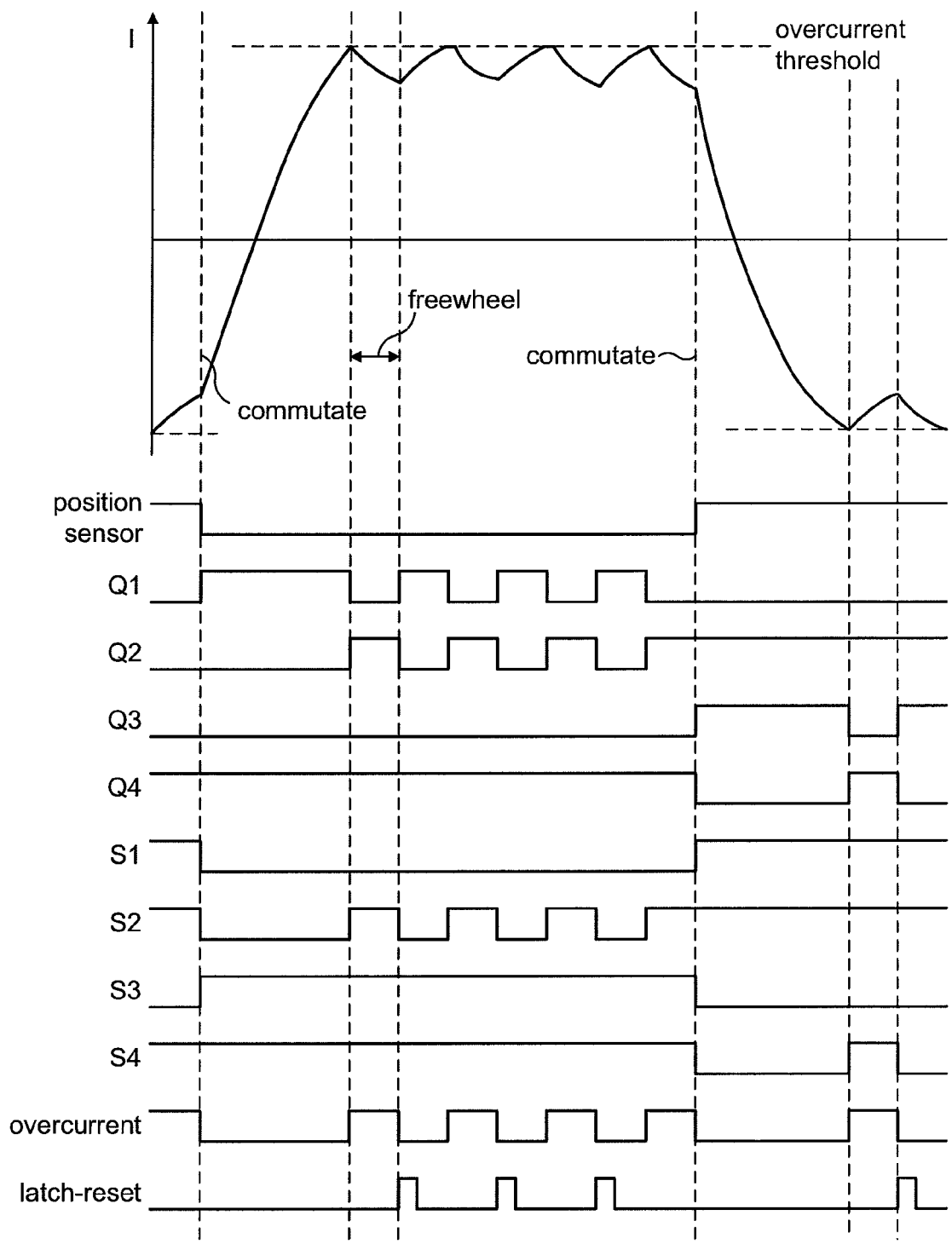
FIG. 5 illustrates waveforms of the motor system during a period of current control.

FIG. 5 illustrates the waveforms of the winding current, the position-sensor signal, the switches Q1-Q4, the control signals S1-S4, the overcurrent signal, and the latch-reset signal over a typical half cycle. As can be seen, the state of the switches Q1-Q4 is the same before and after each overcurrent event.

The current in the winding 19 may be chopped by the current controller 15 many times during an electrical half cycle. As the speed of the motor 8 increases, the back emf induced in the winding 19 increases. Consequently, the number of overcurrent events decreases with motor speed. Eventually, the speed of the motor 8, and thus the magnitude of the back emf, is such that the current in the winding 19 no longer reaches the threshold during each half cycle.

The current controller 15 ensures that the current within the winding 19 does not exceed a threshold. Accordingly, excessive currents are prevented from building up in the winding 19, which might otherwise damage the switches Q1-Q4 of the inverter 11 or demagnetise the rotor 17.

The drive controller 16 comprises a processor 30, a non-volatile memory device 31, six signal inputs and five signal outputs.

The memory device 31 stores software instructions for execution by the processor 30. In response to executing the instructions, the processor 30 controls the operation of the motor system 5. In particular, the processor 30 generates control signals S1-S4 that control the switches Q1-Q4 of the inverter 11 and thus drive the motor 8. The particular operation of the drive controller 16 is described in further detail below. The memory device 31 also stores a plurality of power maps, a plurality of speed-correction maps, and a plurality of position-sensor offsets.

The six signal inputs are the power-supply ID signal, the accessory signal, the power-mode signal, the position-sensor signal, the overcurrent interrupt, and a voltage-level signal.

The voltage-level signal is derived from the power supply line, scaled by a potential divider R2,R3 and filtered by a capacitor C3 to remove switching noise. The voltage-level signal thus provides the drive controller 16 with a measure of the link voltage provided by the power supply 2. Owing to the internal resistance of the power supply 2, the link voltage is less than the open-circuit voltage. For the 6-cell battery pack, the maximum open-circuit voltage is 24.6 V, which corresponds to a link voltage of 23.0 V. For the 4-cell battery pack, the maximum open-circuit voltage is 16.4 V, which corresponds to a link voltage of 14.8 V. In addition to this upper limit, the drive controller 16 stops operating when the link voltage drops below an undervoltage threshold. For the 6-cell battery pack, the undervoltage threshold of the link voltage is 16.8 V, which corresponds to an open-circuit voltage of 19.0 V. For the 4-cell battery pack, the undervoltage threshold of the link voltage is 11.2 V, which corresponds to an open-circuit voltage of 12.8 V. The drive controller 16 therefore operates over a link voltage range of 16.8-23.0 V for the 6-cell battery and 11.2-14.8 V for the 4-cell battery.

The five signal outputs are the four control signals S1-S4 and the latch-reset signal. The four control signals S1-S4 are output to the gate driver module 12, which in response controls the opening and closing of the switches Q1-Q4 of the inverter 11. More specifically, each control signal S1-S4 is output to a respective gate driver 20-23. The latch-reset signal is output to the current controller 15.

The drive controller 16 generates the control signals S1-S4 in response to the signals received at the inputs. As is explained in further detail below, the timing of the control signals S1-S4 is controlled such that the motor 8 is driven at constant output power over a range of speeds. Moreover, constant output power is maintained irrespective of changes in the link voltage of the power supply 2. Consequently, the motor 8 is driven at constant output power as the power supply 2 discharges.

When the drive controller 16 generates a control signal, e.g. S1, to open a particular switch Q1 of the inverter 11, there is a short delay between the generation of the control signal S1 and the physical opening of the switch Q1. If the drive controller 16 were to simultaneously generate a control signal S2 to close the other switch Q2 on the same arm of the inverter 11, a short would potentially arise across the arm of the inverter 11. This short, or 'shoot-through' as it is often termed, would damage the switches Q1,Q2 on that arm of the inverter 11. Accordingly, in order to prevent shoot-through, the drive controller 16 employs a dead-time delay (e.g. 1 μs) between generating control signals for switches on the same arm of the inverter 11. It should therefore be understood that, when reference is made below to exciting or freewheeling the winding 19, the drive controller 16 employs a dead-time delay between control signals. The dead-time delay is ideally kept as short as possible so as to optimise motor performance.

The current controller 15 and the drive controller 16 may form part of a single component microcontroller. A suitable candidate is the PIC16F690 microcontroller by Microchip Technology Inc. This microcontroller has an internal comparator 25, latch 26, PWM module 27, non-volatile memory device 28,31 and processor 30. The output pin of the PWM module 27 is fed back into the input pin of the comparator 25 via the filter 29, which is external of the microcontroller. Additionally, the output of the comparator 25 serves as an internal overcurrent interrupt, which is delivered to the processor 30 of the drive controller 16.

The current controller 15 and the drive controller 16 together provide a form of hysteretic current control. In particular, the current controller 15 generates a latched overcurrent signal in response to an overcurrent event. The overcurrent signal causes the gate driver module 12 to open the high-side switches Q1,Q3 of the inverter 11 to thus disconnect the winding 19 from the link voltage used to excite the winding 19. The drive controller 16 then resets the latch 26 after a predetermined period of time has elapsed, during which the current in the winding 19 decays.

Current control is achieved through a combination of hardware and software. In particular, the hardware of the current controller 15 monitors the current in the winding 19 and generates an overcurrent signal in the event that the current exceeds a threshold. The software of the drive controller 16 then resets the hardware of the current controller 15 after a predetermined time.

By employing hardware to detect an overcurrent event, the control system 9 responds relatively quickly to an overcurrent event. This is important for ensuring that the winding 19 is disconnected from the link voltage as soon as possible following an overcurrent event. If software were instead employed for monitoring an overcurrent event, there would be a significant delay between the overcurrent event and the generation of the overcurrent signal, during which time the current in the winding 19 may rise to a level that results in component damage or rotor demagnetisation.

By employing software to reset the hardware of the current controller 15, the number of hardware components needed to control the current in the winding 19 may be reduced. Additionally, the software of the drive controller 16 is able to control the predetermined period of time over which current in the winding 19 decays. In the present embodiment, the drive controller 16 resets the latch 26 of the current controller 15 after a fixed period of time has elapsed (100 µs). However, the drive controller 16 might equally reset the latch 26 after a period of time that is adjusted according to the speed of the motor 8. Accordingly, the level to which the current decays with each chop may be better controlled.

By chopping the current for a predetermined period of time, it is not necessary to monitor the current in the winding 19 when disconnected from the link voltage. Accordingly, current control may be achieved through the use of a single sense resistor. Not only does this reduce the component cost of the control system 9, but power dissipation through the single sense resistor is typically no more than 1% of the input power.

The operation of the motor system 5, and in particular the drive controller 16, will now be described.

Initialisation Mode

When the power switch 6 is closed, power is delivered from the power supply 2 to the motor system 5 causing the drive controller 16 to power up. On powering up, the drive controller 16 polls the inputs of the power supply ID signal, the accessory signal and the power-mode signal. On the basis of these three signals, the drive controller 16 selects a power map stored in memory 31. As is explained below, each power map stores control values for driving the motor 8 at different output power. As can be seen from Table 2, the drive controller 16 stores five different power maps. If the power supply 2 is a 4-cell battery pack (i.e. if frequency of the power supply ID signal is 25 Hz), then the high-power mode is not available and the power-mode signal is ignored.

TABLE 2

| | Input Signals | | |
|---|---|---|---|
| Power Supply | Accessory | Power-Mode | Power Map |
| 50 Hz | Off | High | 167 W |
| 50 Hz | On | High | 136 W |
| 50 Hz | On or Off | Low | 96 W |
| 25 Hz | Off | Ignored | 107 W |
| 25 Hz | On | Ignored | 83 W |

The power map selected by the drive controller 16 is subsequently used by the drive controller 16 to generate the control signals S1-S4 when operating in 'High-Speed Acceleration Mode' and 'Running Mode'.

While the drive controller 16 is powered up, the drive controller 16 periodically polls (e.g. every 8 ms) the power supply ID signal, the accessory signal and the power-mode signal. If the power supply ID signal is constantly high or low, rather than clocked, this suggest a problem with the power supply 2; the drive controller 16 then opens all switches Q1-Q4 and terminates. If the accessory signal or the power-mode signal changes, the drive controller 16 selects a new power map.

On selecting a power map, the drive controller 16 enters 'Resynchronisation Mode'.

Resynchronisation Mode

The drive controller 16 determines the speed of the motor 8 and selects a mode of operation according to the determined speed. The speed of the motor 8 is obtained by measuring the time interval between two edges of the position-sensor signal, i.e. the pulse width. If the drive controller 16 fails to detect two edges within a predetermined time (e.g. 26 ms), the speed of the motor 8 is deemed to be no greater than 1 krpm; the drive controller 16 then enters 'Stationary Mode'. Otherwise, the drive controller 16 waits until a further edge of the position-sensor signal is detected. The drive controller 16 then averages the time interval across the three edges to provide a more accurate determination of the motor speed. If the time interval between two edges is greater than 1875 µs, the speed of the motor 8 is determined to be between 1 and 16 krpm; the drive controller 16 then enters 'Low-Speed Acceleration Mode'. If the time interval is between 500 and 1875 µs, the speed of the motor 8 is determined to be between 16 and 60 krpm, and the drive controller 16 enters 'High-Speed Acceleration Mode'. Otherwise, the speed of the motor 8 is deemed to be at least 60 krpm and the drive controller 16 enters 'Running Mode'. Table 3 details the time intervals, speeds and modes of operation.

TABLE 3

| Interval (µs) | Speed (krpm) | Mode |
|---|---|---|
| t > 26000 | $\omega \leq 1$ | Stationary |
| $1875 < t \leq 26000$ | $1 < \omega < 16$ | Low-Speed Acceleration |
| $500 < t \leq 1875$ | $16 \leq \omega < 60$ | High-Speed Acceleration |
| $t \leq 500$ | $\omega \geq 60$ | Running |

Stationary Mode (Speed≦1 krpm)

The drive controller, 16 excites the winding 19 for a predetermined time, e.g. 26 ms. During this time, the drive controller 16 commutates the winding 19 (i.e. reverses the direction of excitation) in synchrony with edges of the position-sensor signal. This initial period of excitation should cause the rotor 17 to rotate. If during this predetermined time, two edges of the position-sensor signal are detected, the drive controller 16 enters 'Low-Speed Acceleration Mode'. Otherwise, the drive controller 16 opens all switches Q1-Q4 and writes a 'Failure to Start' error to the memory device 31.

Low-Speed Acceleration Mode (1 krpm<Speed<16 krpm)

The drive controller 16 excites the winding 19 in synchrony with the edges of the position-sensor signal. Synchronous excitation continues until the speed of the motor 8 reaches 16 krpm, as determined by the time interval between successive edges, after which the drive controller 16 enters 'High-Speed Acceleration Mode'. If the motor 8 fails to reach 16 krpm within a predetermined time, e.g. 2.5 s, the drive controller 16 opens all switches Q1-Q4 and writes an 'Underspeed' error to the memory device 31.

High-Speed Acceleration Mode (16≦Speed<60 krpm)

During high-speed acceleration, the drive controller 16 sequentially excites and freewheels the winding 19. More particularly, each electrical half-cycle comprises a single drive period, during which the winding 19 is excited, followed by a single freewheel period, during which the winding 19 is freewheeled. During the drive period, the current in the winding 19 may be chopped by the current controller 15. Consequently, the winding 19 may additionally be freewheeled for short intervals (e.g. 100 μs) within the drive period. However, any freewheeling that occurs within the drive period is distinct from that of the freewheel period. Following each freewheel period, the winding 19 is commutated (i.e. the direction of excitation is reversed).

The drive controller 16 excites the winding 19 in advance of the edges of the position-sensor signal, and thus in advance of the zero-crossings of the back emf in the winding 19. Moreover, the drive controller 16 excites the winding 19 in advance of the edges of the position-sensor signal by a period of time that remains fixed as the motor 8 accelerates from 16 krpm to 60 krpm. The drive controller 16 also freewheels the winding 19 for a period of time that remains fixed as the motor accelerates from 16 krpm to 60 krpm.

As described below in more detail, each power map (see Table 2) comprises a lookup table of advance times and freewheel times for a plurality of voltage levels. On entering 'High-Speed Acceleration Mode' the drive controller 16 polls the voltage-level signal to obtain the excitation voltage, i.e. the link voltage provided by the power supply 2. The drive controller 16 then selects from the power map the advance time, T_ADV, and the freewheel time, T_FREE, corresponding to the excitation voltage. By way of example, if the selected power map is 167 W (see Table 2) and the voltage-level signal indicates that the excitation voltage is 22.7 V, the drive controller 16 selects from the power map an advance time of 34 μs and a freewheel time of 128 μs (see Table 4).

The winding 19 is excited and freewheeled in the following manner. On detecting an edge of the position-sensor signal, the drive controller 16 continues to excite the winding 19 for the time period, T_DRIVE_OFF. T_DRIVE_OFF is calculated from the half-cycle time, T_HALF_CYCLE, the advance time, T_ADV, and the freewheel time, T_FREE:

$$T\_DRIVE\_OFF = T\_HALF\_CYCLE - T\_ADV - T\_FREE$$

The half-cycle time, T_HALF_CYCLE, is the time interval between two successive edges of the position-sensor signal. The advance time, T_ADV, and the freewheel time, T_FREE, are the times obtained from the power map.

Following the period T_DRIVE_OFF, the drive controller 16 freewheels the winding 19 for the period T_FREE, after which the drive controller 16 commutates the winding 19. The net result is that the drive controller 16 excites the winding 19 in advance of the next edge of the position-sensor signal by the advance time, T_ADV.

Figure 6:
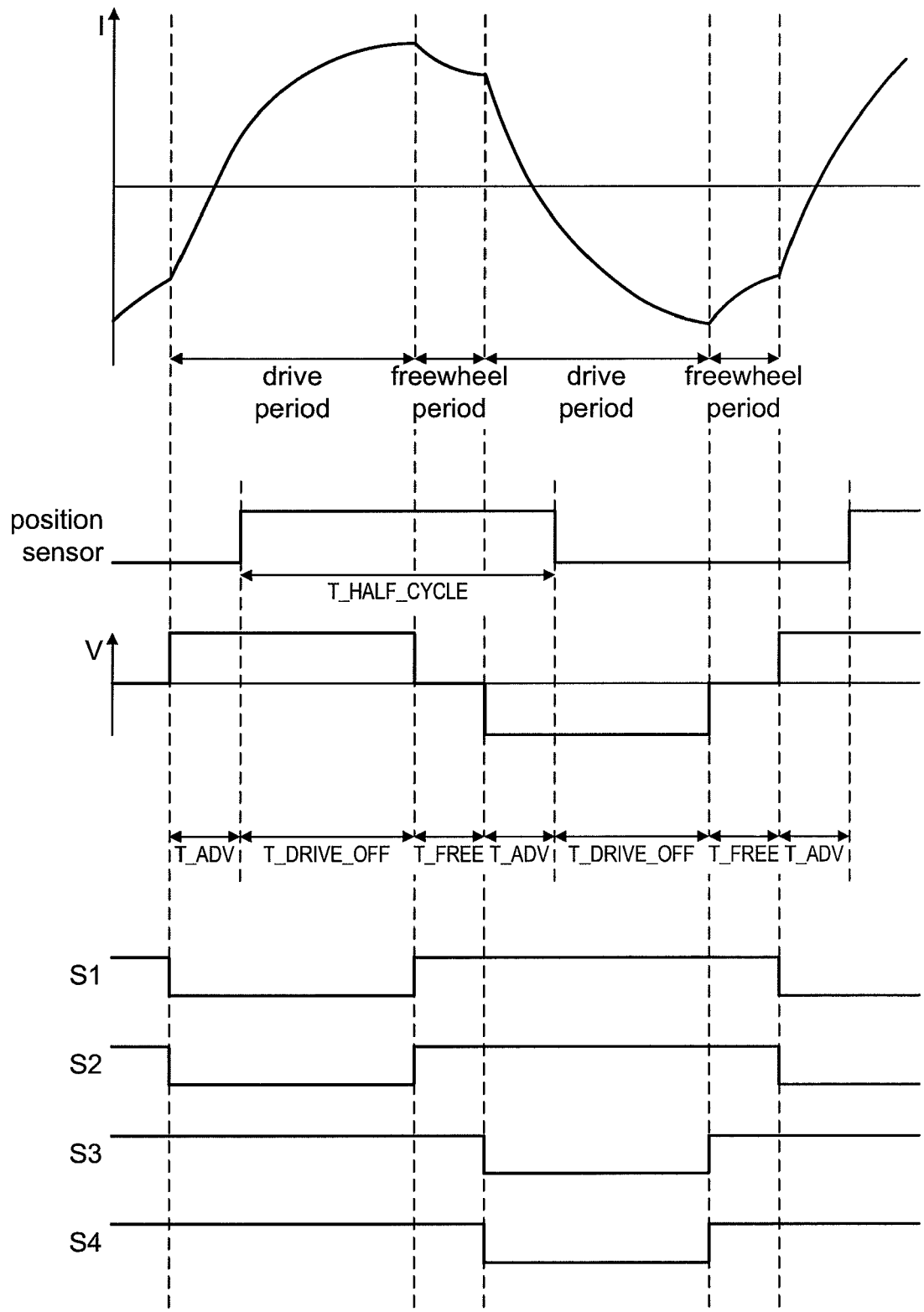
FIG. 6 illustrates waveforms of the motor system when operating at high speed.

FIG. 6 illustrates the waveforms of the winding current, position-sensor signal, excitation voltage, and control signals S1-S4 over a couple of half cycles.

As the motor 8 accelerates, the back emf in the winding 19 increases. It therefore becomes increasingly difficult to drive current, and thus power, into the winding 19 of the motor 8. If the winding 19 were excited in synchrony with the edges of the position-sensor signal, and thus in synchrony with the zero-crossings of the back emf, a speed would be reached whereby it would be no longer possible to drive any more power into the winding 19. By exciting the winding 19 in advance of the edges of the position-sensor signal, and thus in advance of the zero-crossings of the back emf, current is driven into the winding 19 at earlier stage. As a result, more power is driven into the winding 19.

Since the back emf in the winding 19 increases with motor speed, the electrical angle at which excitation occurs in advance of the back emf ideally increases with motor speed, i.e. the advance angle at 60 krpm is ideally greater than that at 16 krpm. By exciting the winding 19 in advance of back emf by a fixed period of time, T_ADV, the corresponding electrical angle, A_ADV, increases with motor speed. In particular, the advance angle, A_ADV, increases proportionally with the motor speed:

$$A\_ADV = T\_ADV * \omega / 60 * 360°$$

where ω is speed of the motor in rpm. Consequently, as the motor 8 accelerates, current is driven into the winding 19 at an increasingly early stage. As a result, more power is driven into the winding 19.

By employing a fixed advance time, T_ADV, there is no need for the drive controller 16 to perform on-the-fly calculations of what advance angle should be used as the motor 8 accelerates. This then greatly minimises the number of instructions needed to be executed by the processor 30 of the drive controller 16, and thus a cheaper processor 30 may be used.

The drive controller 16 freewheels the winding 19 at a time when the back emf in the winding 19 is falling. As the back emf in the winding 19 falls, less torque is achieved for a given level of current. Accordingly, by freewheeling the winding 19 within this region, a more efficient motor system 5 is achieved. Additionally, the back emf in winding 19 may exceed that of the excitation voltage. Consequently, as the back emf in the winding 19 falls, current spikes may arise should the excitation voltage suddenly exceed that of the falling back emf. By freewheeling the winding 19 within the region of falling back emf, current spikes are avoided and thus a smoother current waveform is achieved.

The drive controller 16 continues to sequentially excite and freewheel the winding 19 in the manner described above until the speed of the motor 8 reaches 60 krpm. During this time, the advance and freewheel times, T_ADV and T_FREE, are fixed. On reaching 60 krpm, the drive controller 16 enters 'Running Mode'. If the motor fails to reach 60 krpm within a predetermined time, e.g. 2.5 s, the drive controller 16 opens all switches Q1-Q4 and writes an 'Underspeed' error to the memory device.

Running Mode (Speed≧60 krpm)

As in 'High-speed Acceleration Mode', the drive controller 16 sequentially excites and freewheels the winding 19. Each electrical half-cycle therefore continues to comprise a single drive period followed by a single freewheel period. Again, the winding 19 is excited in advance of the edges of the position-sensor signal, and thus in advance of the zero-crossings of the back emf. However, in contrast to 'High-speed Acceleration Mode', in which fixed times are employed for the advance time and the freewheel time, the drive controller 16 now varies the advance time and the freewheel time so as to achieve constant output power.

The drive controller 16 excites the winding 19 in advance of the edges of the position-sensor signal by an electrical angle, A_ADV, and freewheels the winding 19 over the electrical angle, A_FREE. The drive controller 16 varies both the advance angle, A_ADV, and the freewheel angle, A_FREE, in response to changes in the excitation voltage (i.e. the link voltage of the power supply 2) and the speed of the motor 8 so as to achieve constant output power.

The power supply 2 is a battery pack and therefore the excitation voltage decreases as the battery pack discharges with use. If the electrical angles at which the winding 19 is excited and freewheeled were fixed, the input power, and thus the output power, of the motor system 5 would decrease as the power supply 2 discharges. Accordingly, in order to maintain constant output power, the drive controller 16 varies the advance angle, A_ADV, and the freewheel angle, A_FREE, in response to changes in the excitation voltage. In particular, the advance angle, A_ADV, increases and the freewheel angle, A_FREE, decreases with decreasing excitation voltage. By increasing the advance angle, A_ADV, current is driven into the winding 19 at an earlier stage. By decreasing the freewheel angle, A_FREE, the winding 19 is excited for a longer period over the half cycle. The net result is that, in response to a drop in excitation voltage, more current is driven into the winding 19 over the half cycle and thus constant output power is maintained.

Figure 7:
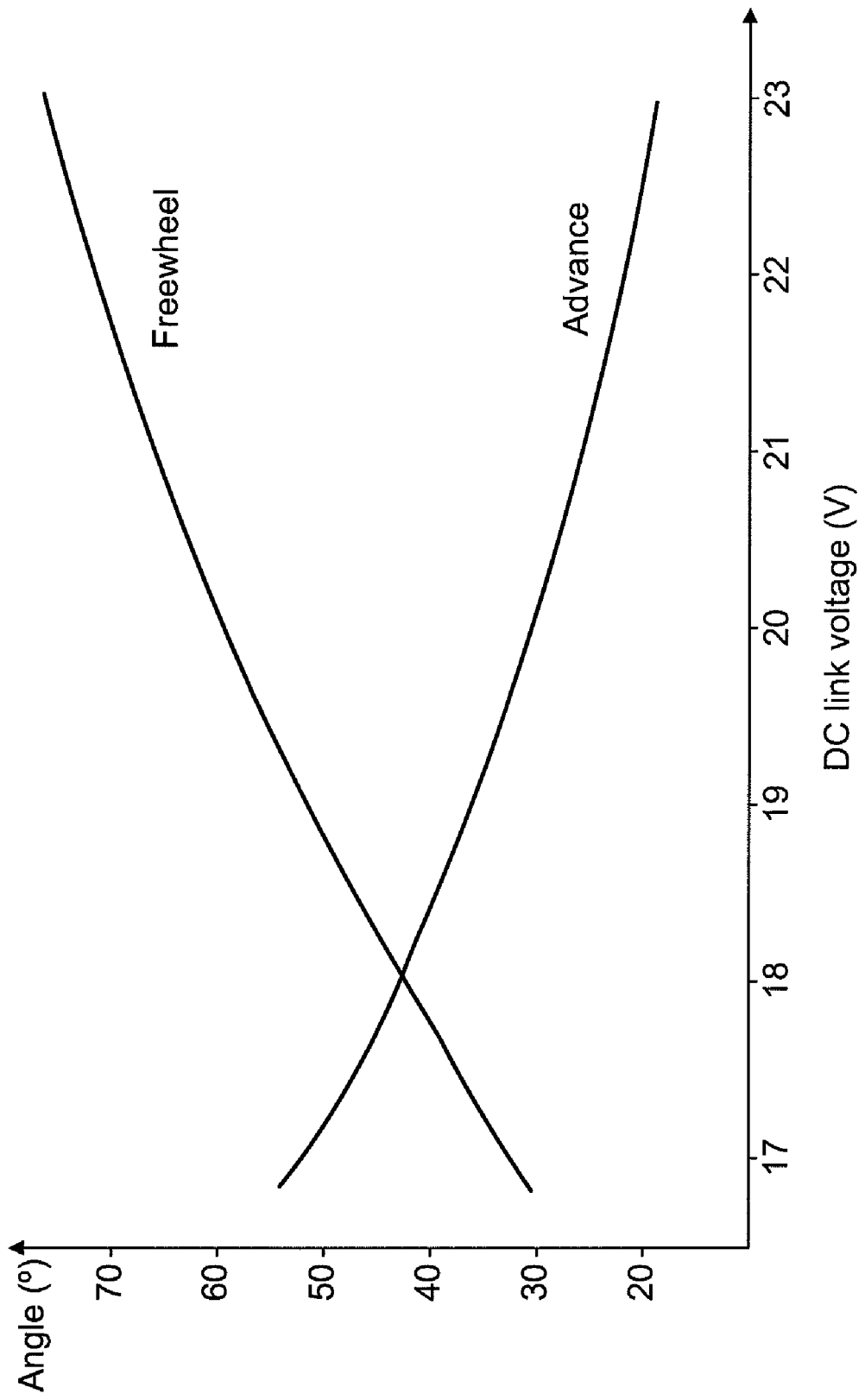
FIG. 7 is a graph of advance angle and freewheel angle versus excitation voltage.

FIG. 7 illustrates the variance in the advance angle and the freewheel angle for constant output power over the voltage range 16.8-23.0 V. As noted above, this voltage range corresponds to the DC link voltage of the 6-cell battery pack. Below 16.8 V, it is difficult to drive sufficient current into the winding 19 so as to maintain constant output power without potentially demagnetising the rotor 17. Additionally, the voltage of the 6-cell battery pack drops off sharply below about 16.8 V. Accordingly, should the DC link voltage drop below 16.8 V, the drive controller 16 opens all switches Q1-Q4 and terminates. A similar pattern is observed for the 4-cell battery pack over the operating range 11.2-14.8 V; again, the drive controller 16 opens all switches Q1-Q4 and terminates when the DC link voltage drops below 11.2 V.

The variance in the advance angle and the freewheel angle is stored by the drive controller 16 as a power map. Each power map comprises a lookup table storing an advance time and a freewheel time for each of a plurality of voltage levels. As is described in more detail further on, the drive controller 16 monitors the voltage-level signal and selects from the power map a corresponding advance time and freewheel time from the power map. The drive controller 16 then uses the advance and freewheel times obtained from the power map to control excitation and freewheeling of the winding 19. Consequently, constant output power is achieved for the motor system 5 irrespective of changes in the excitation voltage. Table 4 illustrates a section of the 167 W power map.

TABLE 4

| DC Link Voltage (V) | Advance Time (µs) | Freewheel Time (µs) | Advance Angle (°) | Freewheel Angle (°) | Input Power (W) | Output Power (W) |
|---|---|---|---|---|---|---|
| 16.8 | 91 | 51.2 | 54.1 | 30.4 | 189.4 | 166.5 |
| 16.9 | 90 | 52.8 | 53.5 | 31.4 | 189.9 | 167.0 |
| 17.0 | 89 | 56.0 | 52.3 | 33.3 | 189.7 | 166.9 |
| 17.1 | 88 | 57.6 | 51.1 | 34.2 | 189.5 | 166.8 |
| . | . | . | . | . | . | . |
| . | . | . | . | . | . | . |
| 22.7 | 34 | 128.0 | 20.2 | 76.0 | 187.5 | 166.8 |
| 22.8 | 33 | 128.0 | 19.6 | 76.0 | 188.3 | 167.5 |
| 22.9 | 32 | 129.6 | 19.0 | 77.0 | 187.6 | 166.9 |
| 23.0 | 31 | 129.6 | 18.4 | 77.0 | 187.3 | 166.6 |

The left-hand portion only of the table is stored by the drive controller 16 as the 167 W power map. The right-hand portion has been included for the purposes of the present description and does not form part of the power map. As can be seen from the table, the 167 W power map stores advance times and freewheel times that deliver a constant output power of 167 W. The DC link voltage is sampled at a resolution of 0.1 V. The power map is thus reasonably small without being so small as to adversely affect the performance of the motor system 5. Of course, depending upon the size of the memory device 31 of the drive controller 16, the resolution of the power map may be increased or decreased.

It will be noted that the power map stores advance times and freewheel times rather than advance angles and freewheel angles. The drive controller 16 uses timers to generate the control signals S1-S4 that excite and freewheel the winding 19. Accordingly, by storing advance and freewheel times rather than angles, the instructions performed by the drive controller 16 are greatly simplified. Nevertheless, the power map might alternatively store advance angles and freewheel angles, which the drive controller 16 then uses to control the excitation and freewheeling of the winding 19.

Each advance and freewheel angle has a corresponding time that depends on the speed of the motor 8. For each power map, the drive controller 16 drives the motor 8 within a particular operating speed range. Each operating speed range has a nominal speed, which is used to calculate the advance times and the freewheel times:

$$T\_ADV = (A\_ADV/360°) * 60/\omega_{nominal}$$

$$T\_FREE = (A\_FREE/360°) * 60/\omega_{nominal}$$

where $\omega_{nominal}$ is the nominal speed in rpm. Table 5 lists the operating speed ranges and the nominal speeds for the various power maps.

TABLE 5

| Power Map | Min Speed (krpm) | Max Speed (krpm) | Nominal Speed (krpm) |
|---|---|---|---|
| 167 W | 89.5 | 104.5 | 99 |
| 136 W | 84.5 | 98.5 | 93.5 |
| 96 W | 75 | 87.5 | 83 |
| 107 W | 77.5 | 91 | 86 |
| 83 W | 71.5 | 83.5 | 79 |

Each power map stores advance times and freewheel times for the motor 8 rotating at the nominal speed. So, for example, the 167 W power map stores advance and freewheel times that achieve constant output power when the motor 8 is rotating at a speed of 99 krpm. When the motor 8 rotates at speeds above or below the nominal speed, the drive controller 16 applies a speed-correction value to each of the advance time and the freewheel time, as described below in more detail.

As noted above in the 'Initialisation' section, the drive controller 16 stores five power maps and selects one of the power maps according to the status of the power-supply ID signal, the accessory signal and the power-mode signal. The output power of the motor 8 is thus determined by the type of power supply 2 that is attached to the product 1, whether or not the accessory 4 is attached and powered on, and whether a user has selected a high-power mode or a low-power mode.

As can be seen from Table 2, a different power map is selected according to whether a 6-cell battery pack or a 4-cell battery pack is attached to the product 1. Since the 4-cell battery pack has a lower charge capacity, the product 1 would have a shorter run time if the same power map were selected for both the 6-cell and the 4-cell battery packs. By selecting a power map that delivers lower output power, a similar run time for the 4-cell battery pack may be achieved at the expense of output power.

When the 6-cell battery pack is attached to the product 1, the user is able to control the output power of the motor 8 via the power-selection switch 7. As can be seen in Table 2, a power map delivering an output power of 96 W is selected in response to a power-mode signal that is logically low, i.e. when the user selects low-power mode. A higher power map delivering either 167 W (with the accessory off) or 136 W (with the accessory on) is then selected in response to a power-mode signal that is logically high, i.e. when the user selects a high-power mode.

Since the accessory 4 draws power from the power supply 2, the power supply 2 will discharge more quickly if the same power map is selected. Additionally, excessive current might be drawn from the power supply 2 in order to power both the accessory 4 and the motor 8. Accordingly, in response to the accessory signal, the drive controller 16 selects a power map that delivers lower output power, see Table 2.

Consequently, the power supply 2 is protected from excessive current draw and a similar run time for the product 1 may be achieved at the expense of output power.

The power maps therefore provide a convenient means for controlling the output power of the motor system 5 in response to one or more input signals.

As noted above, each power map stores advance times and freewheel times that achieve constant output power when the motor 8 operates at a nominal speed. However, as the speed of the motor 8 varies, the back emf in the winding 19 also varies. Consequently, if the angles at which the winding 19 is excited and freewheeled were fixed, the output power of the motor 8 would vary with motor speed. In particular, the output power of the motor 8 would decrease as the motor speed increases. In order to maintain constant output power over each operating speed range, the drive controller 16 varies the advance angle and the freewheel angle in response to changes in speed of the motor 8.

The drive controller 16 applies a speed-correction value to each of the advance angle and the freewheel angle. As the motor speed increases, the back emf in the winding 19 increases. Consequently, in order to maintain constant output power, a speed-correction value is applied to the advance angle that increases the advance angle. Additionally, a speed correction value is applied to the freewheel angle that decreases the freewheel angle. Current is therefore driven into the winding 19 at an earlier stage and over a longer period for each half cycle. As a result, constant output power may be achieved in spite of the increase in back emf.

The speed-correction values that are applied to the advance angle and the freewheel angle depend not only on the speed of the motor 8 but also on the level of the excitation voltage, i.e. the DC link voltage provided by the power supply 2. As the excitation voltage decreases, a particular speed-correction value has a smaller net effect on the output power of the motor 8. Accordingly, in order to maintain constant output power, the speed-corrections values increase in magnitude with decreasing excitation voltage.

For each power map, the drive controller 16 stores two speed-correction maps: an advance speed-correction map and a freewheel speed-correction map. Each speed-correction map comprises a lookup table storing a speed-correction value for each of a plurality of speeds and a plurality of voltage levels. Since the power map stores advance times and freewheel times, the speed-correction values are expressed as times. However, should each power map alternatively store advance angles and freewheel angles, the speed-correction maps might then store speed-correction values expressed as angles. Tables 6 and 7 list respectively the advance speed-correction map and the freewheel speed-correction map for the 167 W power map.

TABLE 6

| Speed (rpm) | DC Link Voltage (V) | | | | | | | |
|---|---|---|---|---|---|---|---|---|
| | 16.8 | 17.6 | 18.4 | 19.2 | 20.0 | 20.8 | 21.6 | 22.2 |
| 89500 | −8.2 | −6.9 | −5.7 | −4.7 | −4.5 | −4.1 | −3.8 | −3.5 |
| 90361 | −7.4 | −6.1 | −5.1 | −4.2 | −3.9 | −3.7 | −3.5 | −3.3 |
| 91241 | −6.5 | −5.4 | −4.4 | −3.7 | −3.5 | −3.3 | −3.1 | −2.8 |
| . | . | . | . | . | . | . | . | . |
| . | . | . | . | . | . | . | . | . |
| 99000 | 0 | 0 | 0 | 0 | 0 | 0 | 0 | 0 |
| . | . | . | . | . | . | . | . | . |
| . | . | . | . | . | . | . | . | . |
| 102180 | 2.1 | 1.7 | 1.4 | 1.2 | 1.1 | 1.2 | 1.1 | 1.0 |
| 103305 | 3.0 | 2.4 | 2.0 | 1.6 | 1.6 | 1.6 | 1.5 | 1.4 |
| 104500 | 3.9 | 3.2 | 2.6 | 2.1 | 2.0 | 2.0 | 1.9 | 1.7 |

TABLE 7

| Speed (rpm) | DC Link Voltage (V) | | | | | | | |
|---|---|---|---|---|---|---|---|---|
| | 16.8 | 17.6 | 18.4 | 19.2 | 20.0 | 20.8 | 21.6 | 22.2 |
| 89500 | 24.9 | 23.8 | 10.9 | 5.4 | 3.4 | 2.0 | 0.6 | 0.6 |
| 90361 | 22.1 | 21.2 | 7.7 | 4.9 | 3.0 | 1.8 | 0.6 | 0.3 |
| 91241 | 19.4 | 18.1 | 5.1 | 4.3 | 2.7 | 1.6 | 0.5 | 0.3 |
| . | . | . | . | . | . | . | . | . |
| . | . | . | . | . | . | . | . | . |
| 99000 | 0 | 0 | 0 | 0 | 0 | 0 | 0 | 0 |
| . | . | . | . | . | . | . | . | . |
| . | . | . | . | . | . | . | . | . |
| 102180 | −6.6 | −7.0 | −5.7 | −1.2 | −1.0 | −0.6 | −0.2 | −0.4 |
| 103305 | −9.4 | −8.8 | −7.1 | −2.1 | −1.3 | −0.8 | −0.3 | −0.1 |
| 104500 | −12.2 | −11.5 | −8.1 | −2.6 | −1.6 | −0.9 | −0.3 | −0.1 |

It can be seen from the speed-correction maps that, as the motor speed increases, the advance time is corrected by an amount that increases the advance time, and the freewheel time is corrected by an amount that decreases the freewheel time. Additionally, as the excitation voltage decreases, the amount by which the advance time and the freewheel time are corrected increases. Since each power map stores an advance time and a freewheel time for a nominal speed, the speed-correction values at the nominal speed are zero.

When selecting values from the power and the speed-correction maps, the drive controller 16 rounds down the excitation voltage and the speed of the motor 8 to the next nearest entry in the lookup table.

The drive controller 16 drives the winding 19 in a manner similar to that described above for 'High-Speed Acceleration Mode'. In particular, on detecting an edge of the position-sensor signal, the drive controller 16 continues to excite the winding 19 for the time period, T_DRIVE_OFF:

$$T\_DRIVE\_OFF = T\_HALF\_CYCLE - T\_ADV - T\_FREE$$

Again, the half-cycle time, T_HALF_CYCLE, is the time interval between two successive edges of the position-sensor signal. Following the period T_DRIVE_OFF, the drive controller 16 freewheels the winding 19 for the period T_FREE, after which the drive controller 16 commutates the winding 19. The net result is that the drive controller 16 excites the winding 19 in advance of the next edge of the position-sensor signal by the advance time, T_ADV.

Again, FIG. 6 illustrates the waveforms of the winding current, position-sensor signal, excitation voltage, and control signals S1-S4 over a couple of half cycles.

The drive controller 16 periodically monitors (e.g. each half cycle) the voltage-level signal to obtain the excitation voltage. The advance time, T_ADV, and the freewheel time, T_FREE, are then obtained by selecting from the relevant power map the advance time and the freewheel time corresponding to the excitation voltage. The times selected from the power map are then corrected by speed-correction values selected from the speed-correction maps. So, for example, if the excitation voltage provided by the power supply is 17.0 V (as determined by the voltage-level signal) and the motor speed is 103 krpm (as determined by the half-cycle time), the drive controller 16 selects an advance time of 89 μs and a freewheel time of 56 μs from the 167 W power map (Table 4). The drive controller 16 then corrects the advance time by 2.09 μs, as determined by the advance speed-correction map (Table 6), and corrects the freewheel time by −6.64 μs, as determined by the freewheel speed-correction map (Table 7). Consequently, the drive controller 16 uses an advance time, T_ADV, of 91.09 μs and a freewheel time, T_FREE, of 49.36 μs.

The drive controller 16 thus drives the motor 8 at constant output power over a range of excitation voltages and motor speeds. Accordingly, constant output power is achieved as the power supply 2 discharges, and as the motor 8 experiences different loads.

The use of lookup tables storing advance and freewheel times, as well as the speed-correction values, greatly simplifies the calculations performed by the processor 30 of the drive controller 16. Consequently, a relatively cheap processor 30 may be used to generate the control signal S1-S4 that excite and freewheel the winding 19.

Position-Sensor Error

Electromagnetic noise may cause the position sensor 13 to generate spurious edges. If detected by the drive controller 16, these spurious edges would cause the drive controller 16 to excite the winding 19 at incorrect times. Not only would this adversely affect the performance of the motor system 5, but it may also result in excessive current in the winding 19 that could potentially damage the switches Q2,Q4 or demagnetise the rotor 17. The drive controller 16 therefore employs measures to minimise the possibility of detecting spurious edges. The particular measures employed depend upon the mode of operation.

When operating in 'Low-Speed Acceleration Mode', the drive controller 16 excites the winding 19 in synchrony with the edges of the position-sensor signal. Following commutation, the drive controller 16 ignores the position-sensor signal for a predetermined time, e.g. 250 μs. Accordingly, any spurious edges falling within this period are ignored.

When operating in 'High-Speed Acceleration Mode' and 'Running Mode', the drive controller 16 employs a position-sensor window. Any edges of the position-sensor signal that are generated outside of this window are ignored by the drive controller 16. If no edge is detected within the position-sensor window, the drive controller 16 opens all switches for a predetermined time (e.g. 50 ms) and enters 'Resynchronisation Mode'.

Since the winding 19 is excited in advance of the edges of the position-sensor signal, each edge of the signal is expected to occur at a time T_ADV following excitation. The position-sensor window therefore starts at excitation and has a length greater than the advance time, T_ADV. Preferably, the position-sensor window has a length corresponding to the sum of the advance time, T_ADV, and a quarter of the half-cycle time, T_HALF_CYCLE. This then provides a sufficiently tight window in which to reliably detect the next edge of the position-sensor signal. Of course, the position-sensor window may be larger or smaller. However, as the position-window decreases in length, the risk of missing a genuine edge of the signal increases, particularly if there is significant imbalance in the duty cycle of the position-sensor signal (see below). As the position-window increases, the risk of detecting a spurious edge increases. Accordingly, the position-sensor is preferably no greater than the sum of the advance time and half the half-cycle time.

In addition to generating spurious edges, the duty cycle of the position-sensor signal may not be balanced. If the half-cycle time is determined from the interval between a single pair of successive edges (i.e. a single pulse) of the position-sensor signal, any imbalance in the duty cycle will result in an incorrect half-cycle time. Since the half-cycle time is used not only to control the time at which the winding 19 is excited, but also to apply the speed-correction values, any error in the half-cycle time may adversely affect the performance of the motor system 5. Accordingly, in order to reduce the error in the half-cycle time, the drive controller 16 obtains the half-cycle time by averaging the interval between successive edges for a plurality of pulses of the position-sensor signal. For example, the drive controller 16 may obtain the half-cycle time by averaging the interval between successive edges for the previous four pulses of the position-sensor signal. By averaging the interval between successive edges for a plurality of pulses, any variance in the half-cycle time is significantly reduced.

Additionally, the drive controller 16 excites the winding 19 in response to the rising edges or the falling edges, but not both, of the position-sensor signal. The drive controller 16 then calculates the drive-off times for both halves of each electrical cycle in response to a single edge, i.e. rising or falling, but not both. In particular, the drive controller 16 calculates the drive-off time for the first half cycle, T_DRIVE_OFF_1, in the manner described above, i.e. using the half-cycle time, the advance time and the freewheel time. The drive-off time for the second half cycle, T_DRIVE_OFF_2, is then obtained by adding the half-cycle time to the drive-off time of the first half cycle:

$$T\_DRIVE\_OFF\_1 = T\_HALF\_CYCLE - T\_ADV - T\_FREE$$

$$T\_DRIVE\_OFF\_2 = T\_DRIVE\_OFF\_1 + T\_HALF\_CYCLE$$

Since the drive controller 16 acts in response to a single edge only, the drive controller 16 is less sensitive to any imbalance in the duty cycle of the position-sensor signal. Accordingly, the performance of the motor system 5 is not adversely affected by duty cycle imbalance.

Post-Assembly Fine Tune

Following assembly of the motor system 5, there are tolerances that may adversely affect the performance of the motor system 5. Consequently, following assembly, the motor system 5 is subject to fine tuning.

The current controller 15 ensures that the current within the winding 19 does not exceed a threshold. This then prevents demagnetisation of the rotor 17 and protects the switches Q1-Q4 of the inverter 11. However, several component tolerances affect the current level at which the current controller 15 generates the overcurrent signal. For example, the current sensor 14 has a tolerance in the resistance of the sense resistor R1 and thus the voltage delivered to the input of the current controller 15 has a variance. Additionally, there is a tolerance in the voltage level of the reference voltage used by the current controller 15. Furthermore, there is a tolerance in the comparator 25 input offset voltage and the input leakage current. Altogether, the tolerance stack on the current threshold can be as much as ±20%. This tolerance is too large to ensure that the motor 8 will run efficiently without potentially demagnetising the rotor 17 or damaging the switches Q1-Q4 of the inverter 11. Accordingly, following assembly of the control system 9, the current controller 15 is fine-tuned to trim out the component tolerances.

The output of the inverter 11 is connected to an inductive load that resembles the motor 8. An external current sensor accurately measures the current through the inductive load. The PWM module 27 is loaded with a relatively low duty cycle, and the inductive load is excited. As the current in the inductive load rises, the current controller 15 generates the overcurrent signal to chop the current. Since the PWM module 27 is loaded with a relatively low duty cycle, the current is chopped at a level below the ideal current threshold. The external current sensor accurately measures the current level at which the overcurrent signal was generated. The duty cycle of the PWM module 27 is then increased and the process is repeated. Eventually, the current controller 15 generates the overcurrent signal at an ideal current threshold. At this point, the value of the duty cycle is written to the memory device 28 of the current controller 15 as a scaling factor.

The current controller 15 is therefore fine-tuned such that an overcurrent signal is generated whenever the current in the winding 19 exceeds a well-defined threshold, irrespective of component tolerances. By employing an accurate external current sensor and a fine resolution for the PWM duty cycle, the threshold at which the overcurrent signal is generated may be tightly controlled. Accordingly, tight control over the current in the winding 19 is achieved without the need for expensive, high-tolerance components. Indeed, the use of a PWM module 27 provides a simple and cost-effective means for generating a threshold voltage.

Following assembly of the motor system 5, there is a tolerance associated with the alignment of the position sensor 13 relative to the motor 8. This tolerance results in a phase difference between the detected position of the rotor 17, as provided by the position-sensor signal, and the actual position of the rotor 17. This in turn translates to a phase difference between the edges of the position-sensor signal and the zero-crossings of the back emf in the winding 19. Following assembly of the motor 8, the motor 8 is driven at a speed of 49.5 krpm. This speed corresponds to half the nominal speed (i.e. 99 krpm) for the 167 W power map. Power to the motor 8 is then interrupted and the back emf in the winding 19 is measured and compared against the edges of the position-sensor signal. The time difference between the edges of the position-sensor signal and the zero-crossings of the back emf provides a measure of the phase difference at 49.5 krpm. The time difference at 49.5 krpm is then scaled for the nominal speed of each power map and stored to the memory device 30 of the drive controller 16 as a position-sensor offset, T_POS_OFFSET. So, for example, the time difference at 49.5 krpm is doubled to provide the position-sensor offset for the 167 W power map, while the time difference is multiplied by 79.0/49.5 to provide the position-sensor offset for the 83 W power map. The drive controller 16 therefore stores a position-sensor offset for each power map. Moreover, the position-sensor offset corresponds to a time difference between the edges of the position-sensor signal and the zero-crossings of back emf when the motor 8 operates at the nominal speed for the corresponding power map (see Table 5).

When operating in 'Running Mode' the drive controller 16 uses the position-sensor offset, T_POS_OFFSET, to correct the drive-off time, T_DRIVE_OFF:

$$T\_DRIVE\_OFF = T\_HALF\_CYCLE - T\_ADV - T\_FREE - T\_POS\_OFFSET$$

Consequently, excitation of the winding 19 is better synchronised with the position of the rotor 17, and thus with back emf, resulting in a more powerful and efficient motor system 5.

The phase difference between the edges of the position-sensor signal and the zero-crossings of the back emf, when expressed as a time interval, decreases with the speed of the motor 8. Ideally then, the drive controller 16 corrects the drive-off time by an amount that varies with the speed of the motor 8. However, by using a fixed time for the position-sensor offset, the calculations performed by the drive controller 16 are greatly simplified. In particular, the drive controller 16 need not calculate what time correction should be applied on the basis of the speed of the motor 8. As a result, the number of instructions performed by the drive controller 16 is reduced and thus a relatively simple and cheap processor 30 may be employed. The corollary to this is that the motor system 5 is optimised for the nominal speed of each power map.

When operating in modes other than 'Running Mode', the speed of the motor is sufficiently slow that any phase difference between the edges of the position-sensor signal and the zero-crossings of back emf is unlikely to impact significantly on the performance of the motor system 5. Additionally, the time spent by the motor system 5 in the acceleration modes is relatively short. Accordingly, in spite of the simplified correction, the performance of the motor system 5 is not adversely affected.

The operating speed range for each power map is relatively narrow in comparison to the full speed range of the motor system 5. In particular, the operational speed range (minimum speed to maximum speed of Table 5) for each power map is no more than 20% of the full speed range (zero to maximum speed). Consequently, the discrepancy between the position-sensor offset and the phase difference at each end of the operating range is relatively small, and thus relatively good performance is achieved over the full operating range using the fixed-time position-sensor offset.

By employing a position-sensor offset to correct for misalignment of the position sensor, accurate synchronisation can be achieved between the edges of the position-sensor signal and the zero-crossings of back emf for a relatively small rotor, e.g. having a diameter of 10 mm or less. Accordingly, a high-speed compact motor system 5 may be realised.

Following manufacture and assembly of the motor system 5, there are tolerances in with the inductance and the back emf of the motor 8. For example, tolerances in the geometry of the pole tips of the stator 18 and the air gap influence the inductance of the winding 19, while tolerances in the magnetic properties of the rotor 17, as well as the geometry of the air gap, influence the back emf in the winding 19. The inductance and back emf of the motor 8 can vary by as much as ±5% and ±10%. Consequently, the output power of different motor systems 5 may differ, in spite of the same control system 9 being used to drive the motor 8.

Following assembly of the motor system 5, the power maps employed by the drive controller 16 are fine-tuned such that the same or similar output power is achieved for each motor system 5 irrespective of tolerances in the inductance and the back emf. The motor system 5 is fine-tuned by an external fine-tune system storing a plurality of power maps. Each power map stored by the fine-tune system comprises advance times and freewheel times that drive a nominal motor (i.e. one having a nominal inductance and nominal back emf) at different output power. The fine-tune system stores each of the power maps listed in Table 2, i.e. power maps that drive the nominal motor at 83 W, 96 W, 107 W, 136 W and 167 W. For each of these base power maps, the fine-tune system additionally stores power maps that drive the nominal motor at a higher output power and at a lower output power. Each base map and the respective additional power maps drive the nominal motor at discrete levels of output power that are separated by a predetermined amount. For the purposes of the present description, it will be assumed that, for each base map, the fine-tune system stores a single high power map that drives the motor at higher output power and a single low power map that drives the motor at lower output. Moreover, the high power map, base power map, and low power map are separated by 4 W. Accordingly, for the 167 W base power map, the fine-tune system additionally stores a 163 W power map, and a 171 W power map. For the 136 W power map, the fine-tune system additionally stores 132 W and 140 W power maps, and so on.

The motor system 5 is fine tuned by loading the set of base power maps into the memory device 30 of the drive controller 16. The motor system 5 is then driven with the 167 W power map using a 17 V DC link supply. The input power of the motor system 5 is then measured. The input power for the 167 W power map should be around 190 W for a DC link voltage of 17 V, see Table 4. If the measured input power is less than 188 W, the drive controller 16 is loaded with the set of high power maps. As a result, the motor system 5 is driven at a higher power (4 W more power) so as to compensate for the power difference. Conversely, if the measured input power is greater than 192 W, the drive controller 16 is loaded with the set of low power maps. As a result, the motor system 5 is driven at a lower power (4 W less power) so as to compensate for the power difference. Accordingly, a different set of power maps is loaded into the drive controller 16 so as to compensate for any differences in the input power of the motor system 5. As a result, the same or similar output power may be achieved for different motors 8 having different inductance and back emf.

By employing a plurality of power maps that are separated by 4 W, the power of the motor system 5 may be fine-tuned to within ±2 W. It will, of course, be appreciated that the separation of the power maps may be decreased so as to achieve tighter tolerance on the power of the motor system 5.

The fine-tuning process has the particular benefit that there is no need to measure the inductance or the back emf of the motor 8. Moreover, by measuring the power of the motor system 5 as it is driven and then compensating accordingly, the fine-tuning process is also able to compensate for armature reaction.

While the fine-tune system measures the input power of the motor system 5, the output power might alternatively be measured. However, it is generally easier to measure the input power of the motor system 5.

Rather than loading a particular set of maps, driving the motor 8 and measuring the power of the motor 8, the motor system 5 may be fine-tuned by measuring a different parameter of the motor 8. The measured parameter is then compared against that of a nominal motor and on the basis of the comparison, one of the plurality of sets of power maps stored by the fine-tune system is loaded into the drive controller 16. For example, the back emf of the motor 8 may be measured and compared against a nominal back emf value (i.e. the back emf for the nominal motor). If the measured back emf corresponds to the nominal back emf, the base power maps are loaded into the drive controller 16. Otherwise, a different set of power maps are loaded into the drive controller 16 that take into account the difference in back emf. Accordingly, more consistent output power and performance may be achieved for different motors irrespective of tolerance in back emf. As noted above, the back emf is measured when obtaining the position-sensor offset. Accordingly, the back emf of the motor 8 may be measured without the need for any additional processes.

By controlling the advance angle and the freewheel angle in response to changes in both excitation voltage and speed, the control system 9 is able to drive the motor 8 at constant output power over a range of excitation voltages and motor speeds. In the present context, constant output power should be understood to mean that the variance in the output power of the motor 8 is no greater than ±5%.

The control system 9 drives the motor 8 not only at constant output power but also at relatively high efficiency (i.e. the ratio of output power to input power). By controlling the advance angle and the freewheel angle in response to changes in both excitation voltage and speed, an efficiency of at least 75% is achievable over the range of excitation voltages and motor speeds. Indeed, for the power maps listed in Table 2, an efficiency of at least 80% is achievable. For example, as can be seen from the figures for input and output power listed in Table 4, an efficiency of around 88% is obtainable with the advance and freewheel angles of the 167 W power map.

The range of excitation voltages over which constant output power and/or high efficiency is achieved is relatively broad. For the 6-cell battery pack the excitation voltage range is 16.8-23.0 V, while for the 4-cell battery pack the excitation voltage range is 11.2-14.8. For both voltage ranges, the minimum voltage is less than 80% of the maximum voltage. This represents a relatively large range over which constant output power and/or high efficiency is achieved. Accordingly, the control system 9 is ideally suited for use in driving a motor of a battery-powered product, where the excitation voltage varies as the battery discharges.

While each operating speed range is relatively narrow in comparison to the full speed range, each operating speed range nevertheless spans at least 10 krpm (Table 5). Moreover, the minimum speed for each operating speed range is greater than 60 krpm, while the maximum speed for each operating speed range is greater than 80 krpm. Indeed, for the 167 W power map, the maximum speed of the operating speed range is greater than 100 krpm. Over this sort of speed range, large differences in output power would arise without the control provided by the control system. Moreover, efficiency at these relatively high speeds would generally be poor without the control provided by the control system.

With the control system 9, a single-phase permanent-magnet motor 8 may be driven at relatively high speeds, and in particular at speeds in excess of 60 krpm. Moreover, high speeds are achieved at relatively high efficiency. Indeed, as can be seen from Table 4, speeds in excess of 100 krpm are attainable for an input power less than 200 W. Accordingly, high speeds are attainable at relatively high efficiency without the need for additional phase windings, which would increase the cost and size of the motor.

The control system 9 employs three different modes of operation that collectively achieve smooth and efficient performance of the motor 8.

When operating in 'Low-Speed Acceleration Mode', the winding 19 is excited in synchrony with zero-crossings of the back emf in the winding 19. At these relatively low speeds, the back emf in the winding 19 is relatively small and does not impact on the ability to drive current, and thus power, into the winding 19. However, by exciting the winding 19 in synchrony with back emf, the control required to drive the motor 8 may be kept relatively simple.

When operating in 'High-Speed Acceleration Mode', the magnitude of the back emf begins to influence the ability to drive current into the winding 19. By exciting the winding 19 in advance of the back emf, current is driven into the winding at earlier stage. Consequently, more power is driven into the motor 8. By exciting the winding 19 in advance of the back emf by a fixed period of time, the winding 19 is excited in advance of the back emf by an angle that increases with rotor speed. Consequently, as the motor 8 accelerates, current is driven into the winding 19 at an increasingly early stage and thus more power is driven into the winding 19. Additionally, by employing a fixed advance time, the control required to drive the motor 8 is relatively simple.

When operating in 'Running Mode', the magnitude of the back emf significantly affects the ability to drive current into the winding 19. As in the 'High-Speed Acceleration Mode', the winding 19 is excited in advance of the back emf such that current is driven into the winding 19 at an earlier stage. Nevertheless, changes in the speed of the motor 8 influence the magnitude of the back emf and thus the output power of the motor 8. Accordingly, by varying the advance time in response to changes in speed, the output power of the motor 8 may be better controlled. In particular, the advance time may be increased with increasing motor speed. The increase in back emf is then compensated by current being driven into the winding 19 at an earlier stage. As a result, the same or similar output power may be achieved irrespective of changes in speed.

The control system 9 therefore employs different operating modes that act to accelerate the motor 8 smoothly and efficiently up to running speed, and then to drive the motor 8 at constant output power.

In the embodiment described above, each power map stores an advance time for each of a plurality of voltages. However, rather than storing advance times, each power map may instead store the sum of the advance time and the freewheel time. This then simplifies the calculation of the drive-off time, T_DRIVE_OFF, which is directly proportional to the sum of advance time and the freewheel time obtained from the power map. Alternatively, since the half-cycle time, T_HALF_CYCLE, at each nominal speed is known (e.g. 303.03 µs at 99 krpm, 320.86 µs at 93.5 krpm, and so on), each power map may instead store a drive-off time, rather than an advance time, for each of the plurality of voltage levels. This then further simplifies the calculations performed by the drive controller 16. Moreover, as noted above, rather than storing advance times and freewheel times, the power map might alternatively store advance angles and freewheel angles. Accordingly, in a more general sense, each power map stores a first control value and a second control value for each of a plurality of voltage levels. The first control value is then proportional to an advance angle and is used to control the angle or time at which the winding 19 is excited. The second control value is then proportional to a freewheel angle and controls the angle or time over which the winding 19 is freewheeled. The drive controller 16 then excites the winding 19 in advance of zero-crossing of back emf at a time defined by the first control value, and freewheels the winding 19 for a time defined by the second control value. The speed-correction maps then store appropriate speed-correction values for correcting the first control value and the second control value. In particular, the advance speed-correction map stores speed-corrections values that are applied to the first control value, and the freewheel speed-correction map stores speed-correction values that are applied to the second control value.

In, the embodiment described above, each power map stores control values that are corrected for speed using correction values stored in a speed-correction map. The storing of correction values has the benefit of reducing the overall memory requirements. In particular, each correction value is smaller than a corresponding control value. Nevertheless, rather than storing a power map and two speed-correction maps for each output power level, the drive controller 16 might alternatively store two master maps, each storing a control value for each of a plurality of speeds and excitation voltages.

In the embodiment described above, both the advance time and the freewheel time are corrected for speed. However, constant output power over each operating speed range might equally be achieved by fixing one of the advance time and the freewheel time and varying the other of the advance time and the freewheel time. Since the winding 19 is freewheeled during a period of falling back emf, the output power of the motor system 5 is more sensitive to changes in the advance time. Accordingly, of the two, the freewheel time is preferably kept fixed and the advance time is corrected for speed. By fixing the freewheel time, the calculations performed by the drive controller 16 are further simplified. Additionally, the freewheel speed-correction map may be omitted for each power map, thus reducing the memory requirements of the drive controller 16. Although the freewheel time may be fixed for different speeds, the corresponding freewheel angle is not. This follows since the electrical angle for a fixed period of time varies with the speed of the motor 8.

Figure 8:
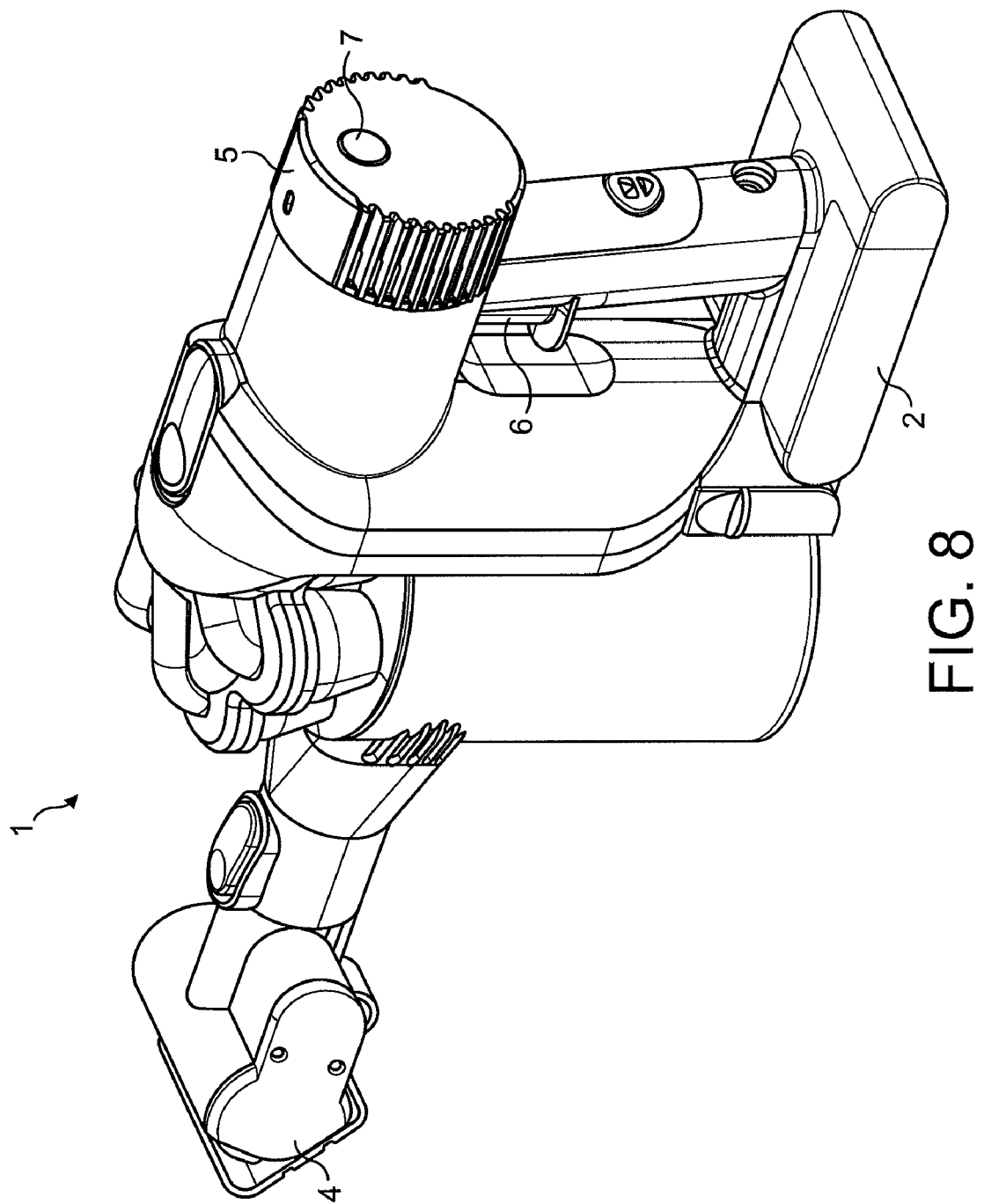
FIG. 8 is a product of the present invention in the form of a vacuum cleaner.

Each power map stores control values that are calculated on the basis of a nominal speed for the motor 8. Speed-correction values are then applied to the control values should the speed of the motor differ from the nominal speed. Additionally, the position-sensor offset for each power map corresponds to a time difference between the edges of the position-sensor signal and the zero-crossings of back emf when the motor 8 operates at the nominal speed. Accordingly, the control system 9 is optimised for operation at the nominal speed within each operating speed range. The nominal speed may therefore be chosen so as to optimise performance of the product 1. For example, the nominal speed may correspond to a speed at which the motor 8 predominantly operates. Alternatively, or additionally, the nominal speed may correspond to a speed at which peak performance for the product 1 is achieved. For example, as illustrated in FIG. 8, the product 1 may be a vacuum cleaner for which peak airwatts occurs at a particular speed within each operating speed range. The nominal speed for each power map then corresponds to the speed at which peak airwatts is achieved.

The particular advance times, freewheel times, and speed-correction values listed in Tables 4-7 are provided by way of example only. The particular control values and speed-correction values needed to achieve constant output power will depend on the particular characteristics of the motor 8. The advance and freewheel angles for a particular motor are obtained from simulation that generates the best performance (e.g. best efficiency) for the motor at the desired output power within the constraints of the control system. Within the simulation, constraints may be placed on the behaviour of the advance angle and the freewheel angle. For example, the advance angle may be constrained to increase and the freewheel angle may be constrained to decrease with decreasing excitation voltage and/or increasing motor speed.

While reference has been made to varying both the advance angle and the freewheel angle in response to changes in excitation voltage and motor speed, significant advantages may nevertheless be gained in varying only one of the advance angle and the freewheel angle. In particular, as already noted, by freewheeling the winding 19 within the region of falling back emf, a more efficient motor system 5 may be realised. Moreover, by varying the freewheel angle in response to changes in voltage and/or speed, better control of both efficiency and output power of the motor system can be achieved, irrespective of any control of the advance angle.

As shown in FIG. 8, the product 1 may take the form of a vacuum cleaner, particularly a handheld vacuum cleaner, having an accessory 4 in the form of a motorised brushbar. The output power of the motor system 5, and thus the suction power of the vacuum cleaner, will then vary according to whether or not the brushbar is attached to the vacuum cleaner and/or turned on. Additionally, the power-mode selection switch 7 may be used by the user to select a high-power mode when increased suction is required. Since the motor system 5 maintains constant output power over each operating speed range, the vacuum cleaner is able to maintain constant suction over a range of loads. Furthermore, since the motor system 5 maintains constant output power in response to changes in excitation voltage, the vacuum cleaner is able to maintain constant suction in response to changes in the voltage of the power supply 2. In particular, where the power supply 2 is a battery pack, the vacuum cleaner in able to maintain constant suction as the battery pack discharges.

While the power supply 2 of the embodiment described above is a DC supply, and in particular a DC battery pack, the power supply 2 might equally comprise an AC supply, rectifier and filter to provide a DC voltage. Moreover, while the motor 8 and the inverter 11 of the embodiment described above each comprise a single phase, the motor 8 and the inverter 11 may comprise additional phases. The drive controller 16 then drives each phase in the manner described above. In particular, each phase is excited in synchrony with the zero-crossings of the back emf during 'Low-Speed Acceleration Mode', and each phase is sequentially excited and freewheeled during 'High-Speed Acceleration Mode' and 'Running Mode'. The position sensor 13 described above is a Hall-effect sensor. However, alternative position sensors capable of outputting a signal indicative of the position of the rotor 17, and thus the zero-crossings of back emf in the winding 19, might equally be employed, such as an optical sensor.

Reference has thus far been made to a control system 9 that controls the operation of a motor 8. However, the control system 9 might equally be used to control the operation of a generator or other electric machine.

The invention claimed is:

1. A method of controlling an electric machine, the method comprising:
    sequentially exciting and freewheeling a winding of the electric machine, wherein the winding is excited by an excitation voltage in advance of zero-crossings of back emf in the winding by an advance angle, and the winding is freewheeled over a freewheel angle;
    varying the advance angle and the freewheel angle in response to changes in the excitation voltage; and
    increasing the advance angle and decreasing the freewheel angle in response to a decrease in the excitation voltage.

2. A method as claimed in claim 1, wherein each electrical half cycle comprises a single drive period and a single freewheel period, and the method comprises exciting the winding during the drive period and freewheeling the winding during the freewheel period.

3. A control system for an electric machine, the control system performing a method as claimed in claim 1.

4. A battery-powered product comprising an electric machine and a control system as claimed in claim 3.

5. A vacuum cleaner comprising an electric machine and a control system as claimed in claim 3.

6. A method of controlling an electric machine, the method comprising:
    sequentially exciting and freewheeling a winding of the electric machine, wherein the winding is excited by an excitation voltage in advance of zero-crossings of back emf in the winding by an advance angle, and the winding is freewheeled over a freewheel angle;
    varying the advance angle and the freewheel angle in response to changes in the excitation voltage; and
    varying the advance angle and the freewheel angle such that the power of the electric machine is substantially constant over a range of excitation voltages.

7. A method of controlling an electric machine, the method comprising:
    sequentially exciting and freewheeling a winding of the electric machine, wherein the winding is excited by an excitation voltage in advance of zero-crossings of back emf in the winding by an advance angle, and the winding is freewheeled over a freewheel angle;
    varying the advance angle and the freewheel angle in response to changes in the excitation voltage; and
    varying the advance angle and the freewheel angle such that the efficiency of the electric machine is at least 75% over a range of excitation voltages.

8. A method as claimed in claim 6 or 7, wherein the range of excitation voltages extends between a minimum voltage and a maximum voltage, and the minimum voltage is less than 80% of the maximum voltage.

9. A method of controlling an electric machine, the method comprising:
    sequentially exciting and freewheeling a winding of the electric machine, wherein the winding is excited by an excitation voltage in advance of zero-crossings of back emf in the winding by an advance angle, and the winding is freewheeled over a freewheel angle;
    varying the advance angle and the freewheel angle in response to changes in the excitation voltage;

storing a lookup table of first control values and second control values for a plurality of voltages, selecting from the lookup table a first control value and a second control value according to the level of the excitation voltage, and exciting the winding at a time defined by the first control value and freewheeling the winding for a time defined by the second control value.

10. A method as claimed in claim 9, wherein the method comprises exciting the winding, monitoring a signal indicative of back emf in the winding, continuing to excite the winding for a drive-off time in response to detecting an edge of the signal, and freewheeling the winding for a freewheel time, wherein the drive-off time is defined by the first control value and the freewheel time is defined by the second control value.

11. A method as claimed in claim 9, wherein the first control value and the second control value achieve the same power for a nominal speed of rotation of the electric machine.

12. A method as claimed in claim 9, wherein the method comprises applying a speed-correction value to at least one of the first control value and the second control value, and the speed-correction value varies with both the speed of the electric machine and the level of the excitation voltage.

13. A method as claimed in claim 12, wherein the method comprises storing a speed lookup table of speed-correction values for a plurality of speeds and a plurality of voltages, selecting from the speed lookup table a speed-correction value according to the speed of the electric machine and the level of the excitation voltage.

14. A method as claimed in claim 13, wherein the speed lookup table stores an advance speed-correction value and a freewheel speed-correction value for each of the plurality of speeds and the plurality of voltages, and the method comprises selecting from the speed lookup table an advance speed-correction value and a freewheel speed-correction value according to the speed of the electric machine and the level of the excitation voltage, and applying the advance-speed correction value to the first control value and applying the freewheel speed-correction value to the second control value.

15. A method of controlling an electric machine, the method comprising:
sequentially exciting and freewheeling a winding of the electric machine, wherein the winding is excited by an excitation voltage in advance of zero-crossings of back emf in the winding by an advance angle, and the winding is freewheeled over a freewheel angle;
varying the advance angle and the freewheel angle in response to changes in the excitation voltage; and
varying at least one of the advance angle and the freewheel angle in response to changes in speed of the electric machine.

16. A method as claimed in claim 15, wherein the method comprises increasing the advance angle in response to an increase in the speed.

17. A method as claimed in claim 15, wherein the method comprises decreasing the freewheel angle in response to an increase in the speed.

* * * * *